United States Patent
Kido et al.

(10) Patent No.: US 11,532,045 B2
(45) Date of Patent: Dec. 20, 2022

(54) SECURITIES TRADING APPARATUS AND SECURITIES TRADING METHOD

(71) Applicant: FUJITSU LIMITED, Kawasaki (JP)

(72) Inventors: Takeru Kido, Numazu (JP); Shinji Yamabiraki, Numazu (JP); Tamaki Tanaka, Numazu (JP); Atsuhito Hirose, Odawara (JP)

(73) Assignee: FUJITSU LIMITED, Kawasaki (JP)

( * ) Notice: Subject to any disclaimer, the term of this patent is extended or adjusted under 35 U.S.C. 154(b) by 327 days.

(21) Appl. No.: 16/690,292

(22) Filed: Nov. 21, 2019

(65) Prior Publication Data

US 2020/0175592 A1 Jun. 4, 2020

(30) Foreign Application Priority Data

Dec. 4, 2018 (JP) .............................. JP2018-227564

(51) Int. Cl.
G06Q 40/00 (2012.01)
G06Q 40/04 (2012.01)
G06F 16/18 (2019.01)
G06F 16/2455 (2019.01)

(52) U.S. Cl.
CPC ......... *G06Q 40/04* (2013.01); *G06F 16/1865* (2019.01); *G06F 16/24552* (2019.01)

(58) Field of Classification Search
None
See application file for complete search history.

(56) References Cited

U.S. PATENT DOCUMENTS

| 5,115,392 A | 5/1992 | Takamoto et al. |
| 2011/0078685 A1* | 3/2011 | Iyengar ................. G06Q 30/00 718/101 |
| 2015/0169332 A1 | 6/2015 | Fisher et al. |

FOREIGN PATENT DOCUMENTS

| JP | 63-94360 A | 4/1988 |
| JP | 2002-324022 A | 11/2002 |
| JP | 2008-135013 A | 6/2008 |
| JP | 2014-106580 A | 6/2014 |
| JP | 2017-504106 A | 2/2017 |
| WO | 2018/056267 A1 | 3/2018 |

OTHER PUBLICATIONS

Japanese Office Action dated Jul. 5, 2022 for corresponding Japanese Patent Application No. 2018-227564, with English Translation, 12 pages.

* cited by examiner

*Primary Examiner* — Olabode Akintola
(74) *Attorney, Agent, or Firm* — Fujitsu Patent Center

(57) ABSTRACT

A securities trading apparatus includes a memory; and a processor coupled to the memory, the processor configured to: extract transactions from trading transactions stored in the memory, the extracted transactions being one of order transactions or insert transactions, each of the order transactions being a buy order transaction or a sell order transaction; and generate a single trading transaction from the extracted transactions.

5 Claims, 21 Drawing Sheets

FIG. 5

```
                                                          ~50
CREATE TABLE PRODUCT (
   PRODUCT_ID    INTEGER,
   PRODUCT_NAME CHARCTER(20),
   PRODUCT_TYPE CHARCTER(20),
   PRODUCT_PRICE  INTEGER,
   PRODUCT_STOCK INTEGER,
   PRODUCT_WEIGHT DECIMAL(5,2),
   PRIMARY KEY(PRODUCT_ID),
   MERGE COMMIT(40)   }~51
);
```

FIG. 9

\<STATE 1\>

| TRANSACTION NUMBER | ORDER TYPE | DATA | | MERGING PROCESS CONCATENATION INFORMATION | EXCLUSIVE CONTROL WAITING CONCATENATION INFORMATION |
|---|---|---|---|---|---|
| | | STOCK NUMBER | STOCK QUANTITY | | |
| No.1 | BUY ORDER | 2781 | 200 | NONE | NONE |
| No.2 | BUY ORDER | 1071 | 100 | NONE | No.3 |
| No.3 | BUY ORDER | 4620 | 300 | NONE | No.4 |
| No.4 | SELL ORDER | 1071 | 100 | NONE | No.5 |
| No.5 | SELL ORDER | ... | ... | NONE | NONE |

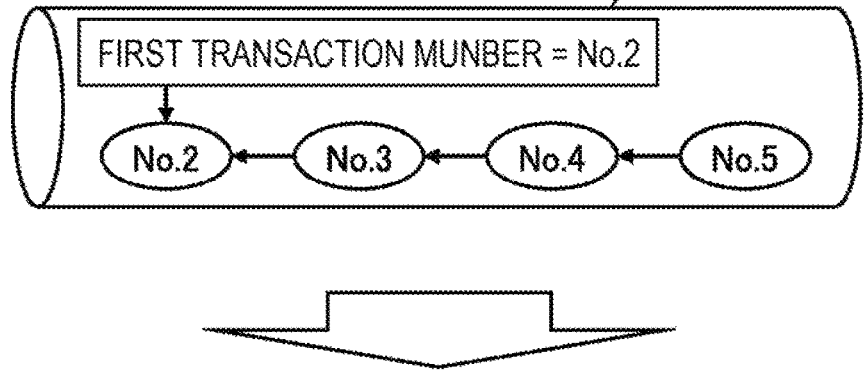

\<STATE 2\>

| TRANSACTION NUMBER | ORDER TYPE | DATA | | MERGING PROCESS CONCATENATION INFORMATION | EXCLUSIVE CONTROL WAITING CONCATENATION INFORMATION |
|---|---|---|---|---|---|
| | | STOCK NUMBER | STOCK QUANTITY | | |
| No.1 | BUY ORDER | 2781 | 200 | No.2 | NONE |
| No.2 | BUY ORDER | 1071 | 100 | No.3 | No.3 |
| No.3 | BUY ORDER | 4620 | 300 | No.4 | No.4 |
| No.4 | SELL ORDER | 1071 | 100 | No.5 | No.5 |
| No.5 | SELL ORDER | ... | ... | NONE | NONE |

FIG. 10

<STATE 1> 241-3

| TRANSACTION NUMBER | ORDER TYPE | DATA | | MERGING PROCESS CONCATENATION INFORMATION | EXCLUSIVE CONTROL WAITING CONCATENATION INFORMATION |
|---|---|---|---|---|---|
| | | STOCK NUMBER | STOCK QUANTITY | | |
| No.1 | BUY ORDER | 2781 | 200 | No.2 | NONE |
| No.2 | BUY ORDER | 1071 | 100 | NONE | No.3 |
| No.3 | CHANGE | 4620 | 300 | NONE | No.4 |
| No.4 | SELL ORDER | 1071 | 100 | NONE | No.5 |
| No.5 | SELL ORDER | ... | ... | NONE | NONE |

<STATE 2> 241-4

| TRANSACTION NUMBER | ORDER TYPE | DATA | | MERGING PROCESS CONCATENATION INFORMATION | EXCLUSIVE CONTROL WAITING CONCATENATION INFORMATION |
|---|---|---|---|---|---|
| | | STOCK NUMBER | STOCK QUANTITY | | |
| No.1 | BUY ORDER | 2781 | 200 | No.2 | NONE |
| No.2 | BUY ORDER | 1071 | 100 | NONE | No.3 |
| No.3 | CHANGE | 4620 | 300 | NONE | No.4 |
| No.4 | SELL ORDER | 1071 | 100 | No.5 | No.5 |
| No.5 | SELL ORDER | ... | ... | NONE | NONE |

FIG. 18

<STATE 1>

| TRANSACTION NUMBER | PROCESS TYPE | DATA | MERGING PROCESS CONCATENATION INFORMATION | EXCLUSIVE CONTROL WAITING CONCATENATION INFORMATION |
|---|---|---|---|---|
| No.1 | INSERT-COMMIT | DATA1 | NONE | NONE |
| No.2 | INSERT-COMMIT | DATA2 | NONE | No.3 |
| No.3 | INSERT-COMMIT | DATA3 | NONE | No.4 |
| No.4 | INSERT-COMMIT | DATA4 | NONE | No.5 |
| No.5 | INSERT-COMMIT | DATA5 | NONE | NONE |

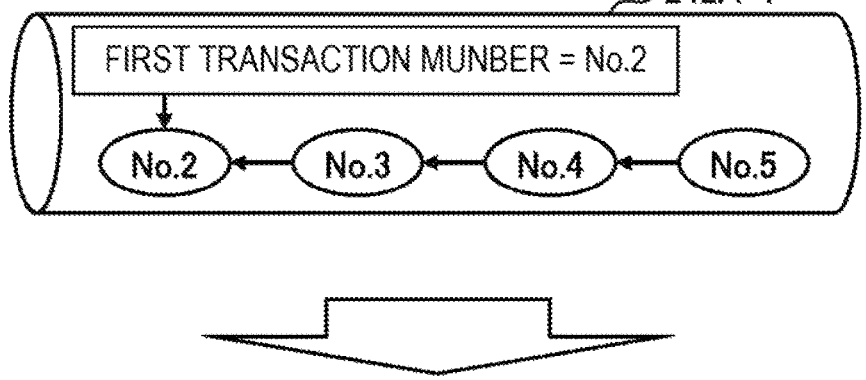

<STATE 2>

| TRANSACTION NUMBER | PROCESS TYPE | DATA | MERGING PROCESS CONCATENATION INFORMATION | EXCLUSIVE CONTROL WAITING CONCATENATION INFORMATION |
|---|---|---|---|---|
| No.1 | INSERT-COMMIT | DATA1 | No.2 | NONE |
| No.2 | INSERT-COMMIT | DATA2 | No.3 | No.3 |
| No.3 | INSERT-COMMIT | DATA3 | No.4 | No.4 |
| No.4 | INSERT-COMMIT | DATA4 | No.5 | No.5 |
| No.5 | INSERT-COMMIT | DATA5 | NONE | NONE |

FIG. 19

<STATE 1> 241A-3

| TRANSACTION NUMBER | PROCESS TYPE | DATA | MERGING PROCESS CONCATENATION INFORMATION | EXCLUSIVE CONTROL WAITING CONCATENATION INFORMATION |
|---|---|---|---|---|
| No.1 | INSERT-COMMIT | DATA1 | No.2 | NONE |
| No.2 | INSERT-COMMIT | DATA2 | No.3 | No.3 |
| No.3 | INSERT-COMMIT | DATA3 | NONE | No.4 |
| No.4 | UPDATE | DATA4 | NONE | No.5 |
| No.5 | INSERT-COMMIT | DATA5 | NONE | No.6 |
| No.6 | INSERT-COMMIT | DATA6 | NONE | NONE |

<STATE 2> 241A-4

| TRANSACTION NUMBER | PROCESS TYPE | DATA | MERGING PROCESS CONCATENATION INFORMATION | EXCLUSIVE CONTROL WAITING CONCATENATION INFORMATION |
|---|---|---|---|---|
| No.1 | INSERT-COMMIT | DATA1 | No.2 | NONE |
| No.2 | INSERT-COMMIT | DATA2 | No.3 | No.3 |
| No.3 | INSERT-COMMIT | DATA3 | NONE | No.4 |
| No.4 | UPDATE | DATA4 | NONE | No.5 |
| No.5 | INSERT-COMMIT | DATA5 | No.6 | No.6 |
| No.6 | INSERT-COMMIT | DATA6 | NONE | NONE |

SECURITIES TRADING APPARATUS AND SECURITIES TRADING METHOD

CROSS-REFERENCE TO RELATED APPLICATION

This application is based upon and claims the benefit of priority of the prior Japanese Patent Application No. 2018-227564, filed on Dec. 4, 2018, the entire contents of which are incorporated herein by reference.

FIELD

The embodiments discussed herein are related to a securities trading apparatus and a securities trading method.

BACKGROUND

In a securities trading system that deals with financial products and so forth, a group of business applications acting as clients execute a huge number of transactions such as buy orders and sell orders, and request transaction processes of a server that manages a database.

Also, such a securities trading system is known to be provided with an active server that executes transaction processes under normal conditions and multiple standby servers in order to ensure high availability. The transaction processes include a data manipulation and a commit process of synchronizing data between the active server and the standby servers.

Related techniques are disclosed in, for example, Japanese Laid-open Patent Publication No. 63-94360, Japanese Laid-open Patent Publication No. 2014-106580, and International Publication Pamphlet No. WO 2018/056267.

In the case where orders for a specific financial product are concentrated in the aforementioned securities trading system, requests for transaction processes on a specific table are concentrated on the server. The server executes the transaction processes in sequence, and transaction processes other than an executing transaction process have to wait for execution until the executing transaction process is completed. Therefore, as the number of transaction processes waiting for execution increases, the processing time becomes longer.

SUMMARY

According to an aspect of the embodiments, a securities trading apparatus includes a memory; and a processor coupled to the memory, the processor configured to: extract transactions from trading transactions stored in the memory, the extracted transactions being one of order transactions or insert transactions, each of the order transactions being a buy order transaction or a sell order transaction; and generate a single trading transaction from the extracted transactions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a definition file;

FIG. 9 is a first diagram for describing a waiting trading transaction merging process;

FIG. 10 is a second diagram for describing the waiting trading transaction merging process;

FIG. 18 is a first diagram for describing a waiting transaction merging process;

FIG. 19 is a second diagram for describing the waiting transaction merging process;

DESCRIPTION OF EMBODIMENTS

First Embodiment

Figure 1:
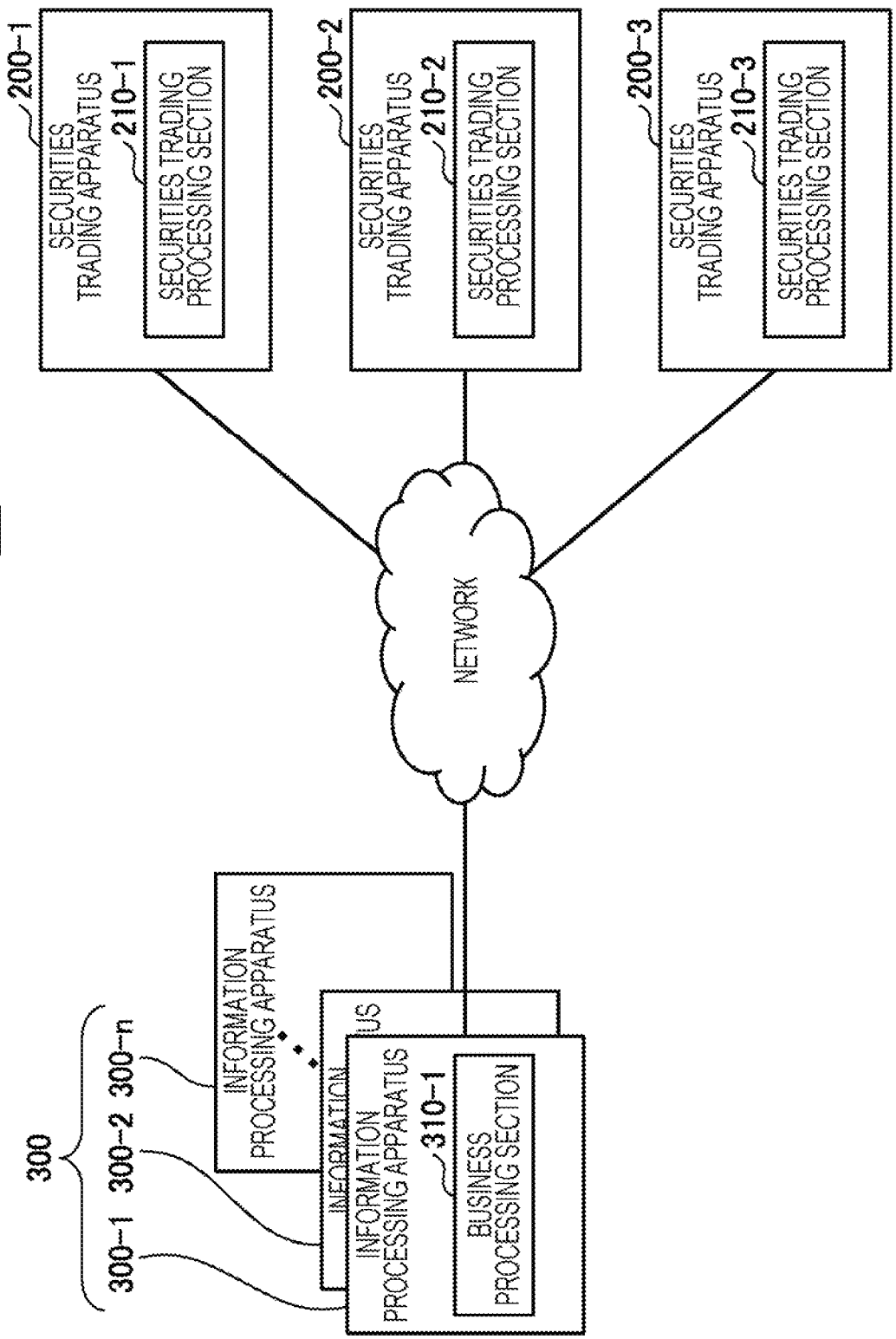
FIG. 1 is a diagram illustrating an example of a system configuration of a securities trading system in a first embodiment.

Hereinafter, a first embodiment will be described with reference to the drawings. FIG. 1 is a diagram illustrating an example of a system configuration of a securities trading system in the first embodiment.

A securities trading system 100 in the present embodiment includes securities trading apparatuses 200-1, 200-2, and 200-3, and information processing apparatuses 300-1, 300-2, . . . , 300-n, and the apparatuses are coupled to each other via a network.

The securities trading apparatuses 200-1, 200-2, and 200-3 are, for example, servers that execute transaction processes for transactions executed by the information processing apparatuses 300-1, 300-2, . . . , 300-n and include an active server and standby servers. The active server is a server that executes transaction processes under the normal conditions, and the standby server is a backup server that acts as the active server when the active server has a failure.

The following description is provided, for example, on the assumption that the securities trading apparatus 200-1 is the active server and the securities trading apparatuses 200-2 and 200-3 are the standby servers. Here, the securities trading apparatuses 200-1, 200-2, and 200-3 include securities trading processing sections 210-1, 210-2, and 210-3, respectively, and have the same functions.

In the following description, the securities trading apparatuses 200-1, 200-2, and 200-3 are referred to as the securities trading apparatuses 200 when they are not distinguished from each other, and the securities trading processing sections 210-1, 210-2, and 210-3 are referred to as the securities trading processing sections 210 when they are not distinguished from each other.

The information processing apparatuses 300-1, 300-2, ..., 300-n are, for example, used in securities companies or others that deal with brokerage and underwriting of financial products and so on. The information processing apparatuses 300-1, 300-2, ..., 300-n include business processing sections 310-1, ..., 310-n, respectively. The business processing sections 310-1, ..., 310-n are implemented by a business application installed in the information processing apparatuses. In the following description, the information processing apparatuses 300-1, 300-2, ..., 300-n are referred to as the information processing apparatuses 300 when they are not distinguished from each other, and the business processing sections 310-1, ..., 310-n are referred to as the business processing sections 310 when they are not distinguished from each other.

Here, the securities trading system 100 may include any desirable number of securities trading apparatuses 200 and any desirable number of information processing apparatuses 300. In addition, although the two securities trading apparatuses 200 serve as the standby servers in FIG. 1, any desirable number of standby servers may be provided.

In the securities trading system 100 in the present embodiment, each information processing apparatus 300 requests a transaction process of the securities trading apparatus 200 (active server) when its own business processing section 310 executes a transaction.

Note that transactions executed by the business processing section 310 include, for example, transactions to sell and buy securities (stocks, bonds, and so on), transactions to change an order quantity, transactions to cancel an order, transactions to refer to order details.

In the following description, a transaction generated by the business processing section 310 is referred to as a trading transaction. Among trading transactions, transactions to sell and buy are referred to as a sell order transaction and a buy order transaction, a transaction to change an order quantity is referred to as a change transaction, a transaction to cancel an order is referred to as a cancellation transaction, and a transaction to refer to order details is referred to as a reference transaction in some cases. In addition, the sell order transaction and the buy order transaction are collectively referred to as order transactions in some cases.

The securities trading apparatus 200 in the present embodiment extracts a sell order transaction and a buy order transaction from trading transactions for which requests for transaction processes are received from the information processing apparatuses 300, and unites the extracted transactions into one trading transaction.

The transaction process executed by the securities trading apparatus 200-1 acting as the active server includes a commit process of synchronizing data between the securities trading apparatus 200-1 and the securities trading apparatuses 200-2 and 200-3 serving as the standby servers by communicating with the standby servers and copying the data to the standby servers. In this regard, a time required for the commit process accounts for a majority of an entire time required for the transaction process by the securities trading apparatus 200-1.

In the present embodiment, multiple order transactions are united into one transaction and thereby the number of the order transactions is reduced. This makes it possible to reduce the number of times that the commit process, which has to be done for every order transaction, is executed for the standby severs, and consequently speed up the securities trading processing.

Figure 2:
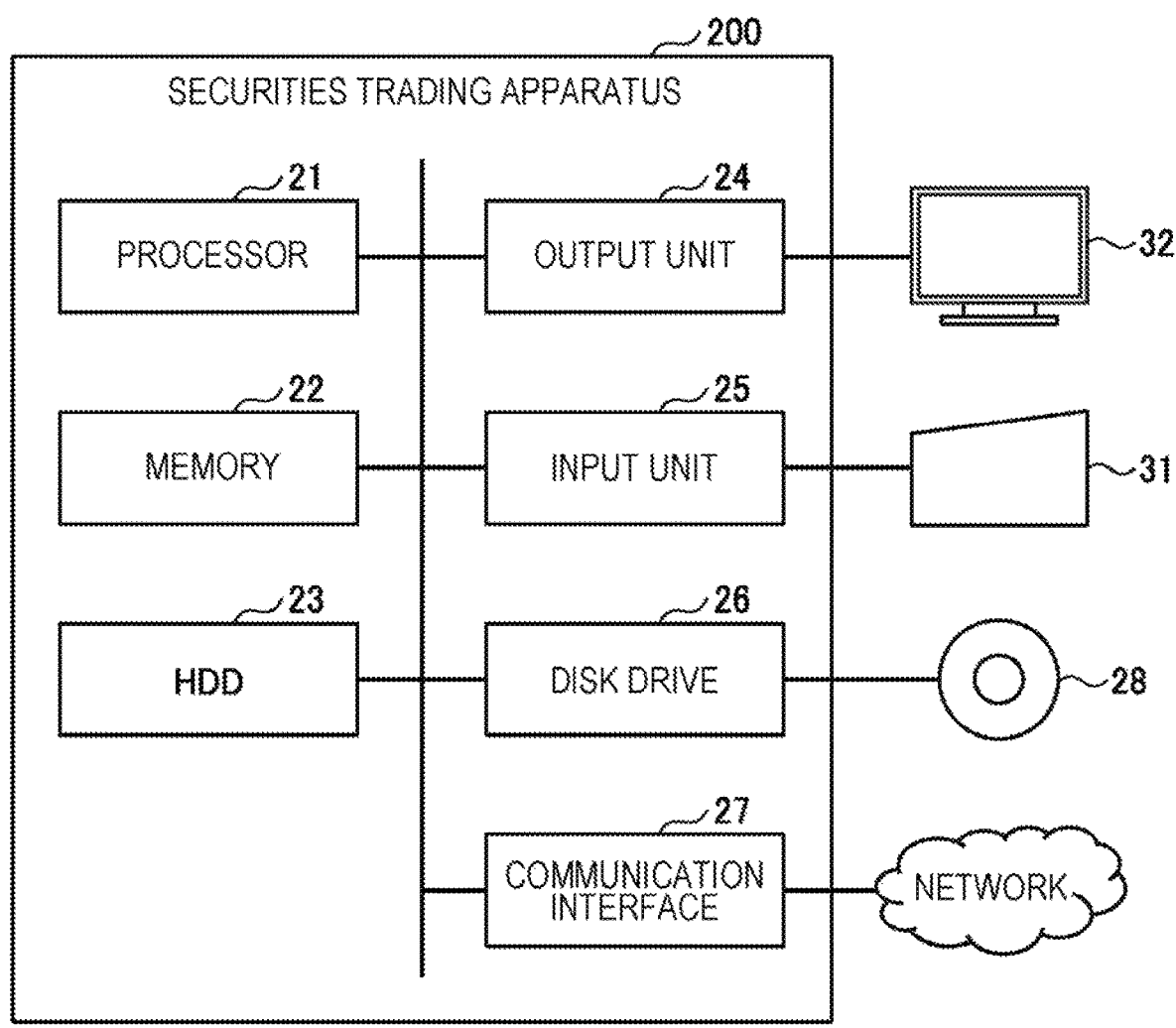
FIG. 2 is a diagram illustrating an example of a hardware configuration of a securities trading apparatus.

Hereinafter, the securities trading apparatus 200 in the present embodiment will be described. FIG. 2 is a diagram illustrating an example of a hardware configuration of the securities trading apparatus.

The securities trading apparatus 200 in the present embodiment includes a processor 21, a memory 22, a hard disk drive (HDD) 23, an output unit 24, an input unit 25, a disk drive 26, and a communication interface 27, which are coupled to each other via a bus.

The input unit 25 receives inputs of various kinds of information through an input device 31 such as a keyboard and a pointing device, for example. The output unit 24 outputs various kinds of information through an output device 32 such as a display, for example. The communication interface 27 is used to couple to a network.

A securities trading program for enabling a securities trading processing section 210 is at least part of various programs for controlling the securities trading apparatus 200. The securities trading program is provided, for example, through distribution of a storage medium 28 or downloading from the network. The storage medium 28 storing the securities trading program may be any of various types of storage media such as a storage medium configured to optically, electrically, or magnetically store information like a compact disc read-only memory (CD-ROM), a flexible disk, a magneto-optical disc, and so on, and a semiconductor memory configured to electrically store information like a read-only memory (ROM), a flash memory, and so on.

When the storage medium 28 storing the securities trading program is set in the disk drive 26, the securities trading program is installed in the HDD 23 from the storage medium 28 via the disk drive 26. The securities trading program downloaded from the network is installed in the HDD 23 via the communication interface 27.

The HDD 23 stores the installed securities trading program and stores various files, various data, and the like acquired by the securities trading apparatus 200. The memory 22 reads the securities trading program from the HDD 23 and stores the securities trading program at the start-up of the securities trading apparatus 200. The processor 21 implements various processes to be described later in accordance with the securities trading program stored in the memory 22.

The memory 22 in the present embodiment is, for example, a volatile memory, and serves as an in-memory database of the securities trading apparatus 200.

The information processing apparatus 300 is also an information processing apparatus including a processor and a memory, and the hardware configuration thereof is the same as the hardware configuration of the securities trading apparatus 200 and therefore will not be described in detail.

Figure 3:
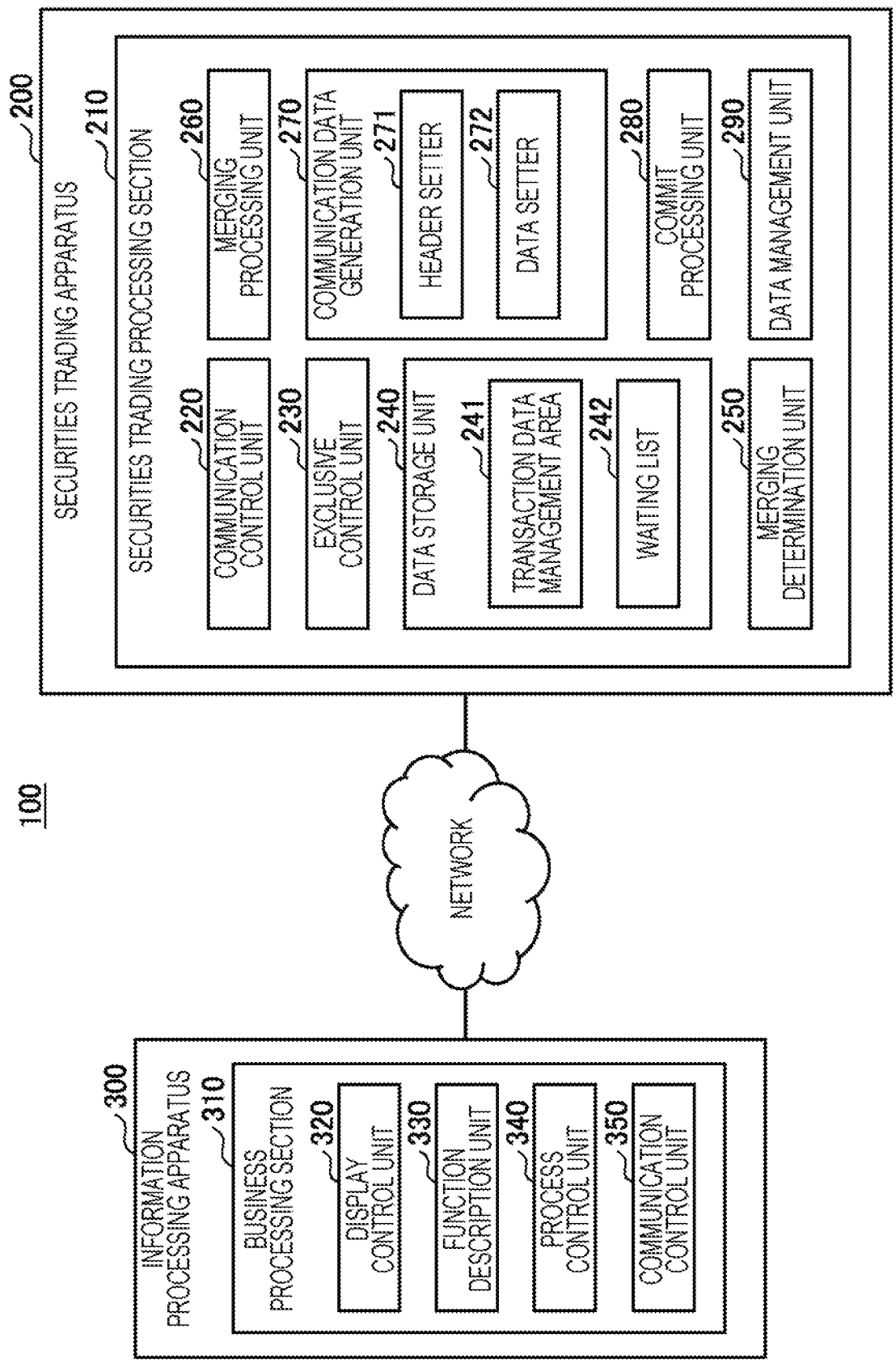
FIG. 3 is diagram for describing functions equipped in apparatuses of the securities trading system in the first embodiment.

Next, functional configurations of the apparatuses included in the securities trading system 100 in the present embodiment will be described with reference to FIG. 3. FIG. 3 is a diagram for describing functions equipped in the apparatuses in the securities trading system in the first embodiment.

The securities trading apparatus 200 in the present embodiment includes the securities trading processing section 210. The securities trading processing section 210 includes a communication control unit 220, an exclusive control unit 230, a data storage unit 240, a merging determination unit 250, a merging processing unit 260, a communication data generation unit 270, a commit processing unit 280, and a data management unit 290.

The communication control unit 220 controls communication with the information processing apparatuses 300. Specifically, the communication control unit 220 accepts reception of transaction data of a trading transaction from each information processing apparatus 300 as a request to execute a trading transaction process.

In addition, the communication control unit 220 stores the received transaction data of trading transactions into a transaction data management area 241 of the data storage unit 240 while assigning reception numbers to the respective transactions in the order in which they are received.

Note that the transaction is the unit of a series of inseparable information processing and the transaction process means a process in which a series of related processing is entirely managed as one unit of processing in order to ensure the consistency of the processing. The transaction data is data accumulated when the securities trading system 100 is operated, and is data specifying details of trading of a financial product.

The exclusive control unit 230 causes a trading transaction with the transaction data stored first among trading transactions with the transaction data stored in the transaction data management area 241 of the data storage unit 240 to execute the transaction process. In addition, the exclusive control unit 230 causes the other trading transactions to store their respective transaction data into a waiting list 242.

Here, in the following description, a trading transaction that executes the transaction process is referred to as an executing trading transaction, and a trading transaction that stores the transaction data into the waiting list 242 is referred to as a waiting trading transaction.

Also in the following description, reception of multiple requests for multiple trading transaction processes within a very short period of time is expressed as simultaneous reception of data of multiple transactions in some cases.

The data storage unit 240 is an example of an in-memory database built on the memory 22. The data storage unit 240 stores the transaction data of the trading transactions. In addition, the data storage unit 240 includes the transaction data management area 241 and the waiting list 242.

Although the data storage unit 240 is described as the example of the in-memory database built on the memory 22 in the present embodiment, the data storage unit 240 may be built in the HDD 23.

The transaction data management area 241 stores information specifying a control method in the case where the communication control unit 220 simultaneously receives multiple requests for trading transaction processes.

The waiting list 242 stores the transaction data of the waiting trading transactions. The transaction data management area 241 and the waiting list 242 will be described in detail later.

The merging determination unit 250 causes the executing trading transaction to determine whether or not to execute a process to unite the transaction data of multiple trading transactions stored in the transaction data management area 241 into the transaction data of one trading transaction. In other words, the merging determination unit 250 causes the executing trading transaction to determine whether to unite multiple trading transactions into one trading transaction.

In the following description, uniting multiple trading transactions into one trading transaction is sometimes expressed as merging trading transactions.

Specifically, the merging determination unit 250 determines whether or not to merge trading transactions depending on, for example, the presence/absence of transaction data of a waiting trading transaction in the transaction data management area 241, the number and data size of trading transactions to be merged, and the like. Conditions to which the merging determination unit 250 refers in making the aforementioned determination may be written in, for example, a definition file stored in a storage area in the HDD 23. The definition file will be described in detail later.

In the present embodiment, in accordance with a determination result by the merging determination unit 250, the executing trading transaction concatenates itself and a waiting trading transaction stored in the waiting list 242, so that the multiple trading transactions are united into one trading transaction.

In other words, the merging determination unit 250 in the present embodiment is an example of an extraction unit that extracts, from the waiting list 242, trading transactions to be merged by the merging processing unit 260.

The merging processing unit 260 in the present embodiment forms one trading transaction by associating the waiting trading transactions extracted in accordance with the determination by the merging determination unit 250 with the executing trading transaction. In other words, the merging processing unit 260 is an example of a generation unit that generates one trading transaction from a buy order transaction and a sell order transaction extracted in accordance with the determination by the merging determination unit 250.

The merging determination unit 250 and the merging processing unit 260 in the present embodiment are invoked by the executing trading transaction, and caused to execute the functions thereof by the executing trading transaction. The processing by the merging processing unit 260 will be described in detail later.

The communication data generation unit 270 causes the executing trading transaction to generate communication data for synchronizing the transaction data with the securities trading apparatuses 200-2 and 200-3 serving as the standby servers.

The communication data generation unit 270 includes a header setter 271 and a data setter 272. The header setter 271 causes the executing trading transaction to set header information in the communication data.

The data setter 272 causes the executing trading transaction to set data information in the communication data. The communication data generation unit 270 will be described in detail later.

The commit processing unit 280 executes the commit process of synchronizing the communication data with the securities trading apparatuses 200-2 and 200-3, and thereby validating the communication data in the securities trading apparatuses 200-2 and 200-3.

Specifically, the commit processing unit 280 executes the process of transmitting the communication data to the securities trading apparatuses 200 serving as the standby servers, causing the securities trading apparatuses 200 to copy the communication data, and receiving responses indicating that the communication data is copied and validated from the securities trading apparatuses 200.

The data management unit 290 deletes information stored in the transaction data management area 241 and the waiting list 242.

The information processing apparatus 300 in the present embodiment includes the business processing section 310. The business processing section 310 includes a display control unit 320, a function description unit 330, a process control unit 340, and a communication control unit 350.

The display control unit 320 causes the information processing apparatus 300 to display an operation screen and the like of the business application implemented by the business processing section 310.

The function description unit 330 specifies description of each function to be invoked by the process control unit 340 in response to an operation. The process control unit 340 invokes a function described in the function description unit 330 in response to an operation, and generates transaction data to be transmitted to the securities trading apparatus 200.

The communication control unit 350 transmits the transaction data generated by the process control unit 340 to the securities trading apparatus 200.

Figure 4:
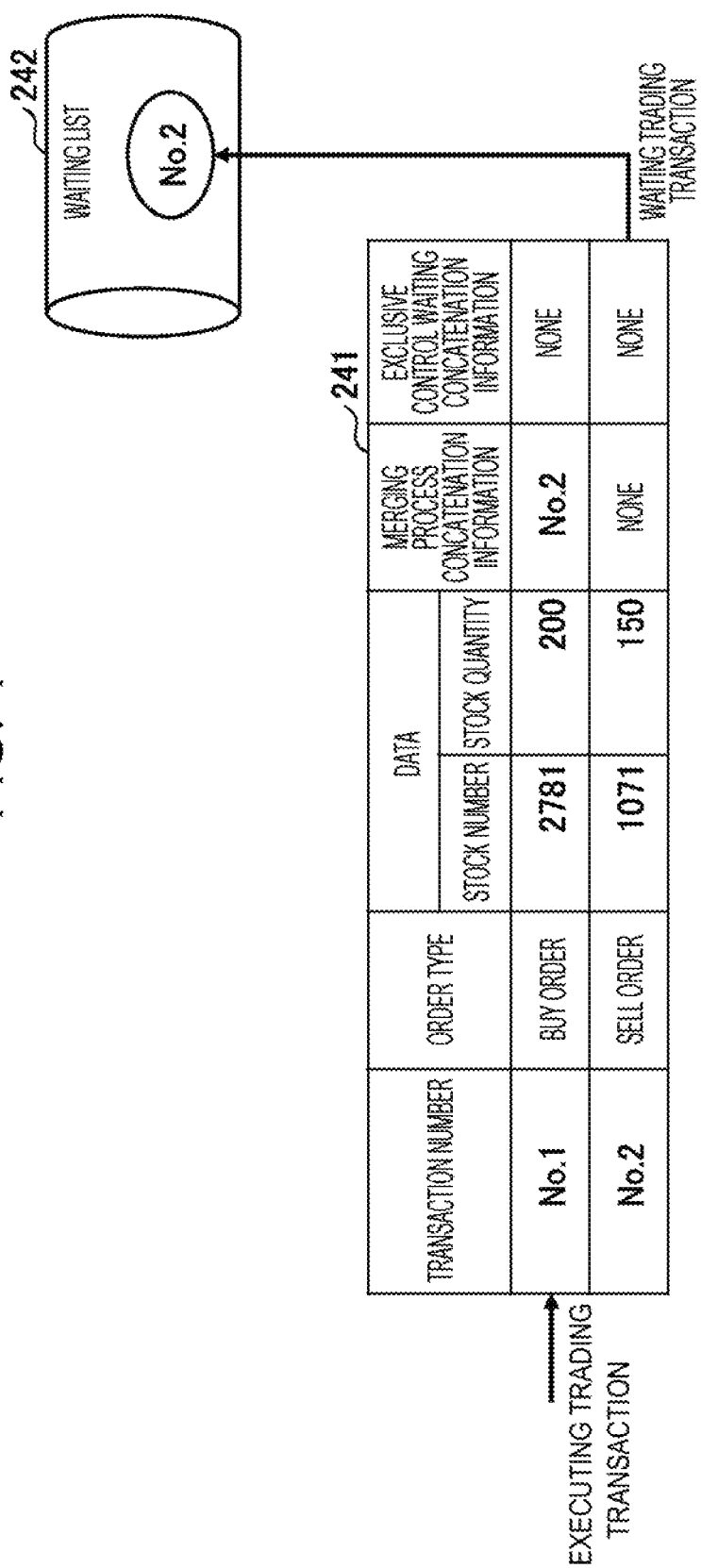
FIG. 4 is a diagram for describing how to concatenate an executing trading transaction with a waiting trading transaction.

Next, with reference to FIG. 4, how to concatenate an executing trading transaction with a waiting trading transaction in the present embodiment will be described. FIG. 4 is a diagram for describing how to concatenate an executing trading transaction with a waiting trading transaction.

FIG. 4 illustrates the state of the transaction data management area 241 in the case where two sets of transaction data are received within a very short period of time.

Specifically, FIG. 4 illustrates the state of the transaction data management area 241 in the case where a buy order transaction and a sell order transaction are received simultaneously.

Here, description will be given for the transaction data of a trading transaction and transaction management information stored in the transaction data management area 241.

The transaction data includes items named "order type" and "data" as information items. A value in the item "order type" indicates a type of trading. A value in the item "data" is a message indicating details of the trading. Specifically, the value in the item "data" includes a stock number and a stock quantity of securities.

The transaction management information stored in the transaction data management area 241 in the present embodiment is information including the transaction data, a transaction number, merging process concatenation information, and exclusive control waiting concatenation information.

In other words, the transaction management information includes items named "transaction number", "order type", "data", "merging process concatenation information", and "exclusive control waiting concatenation information" as information items.

A value in the item "transaction number" is a sequential number in the order in which each trading transaction stored in the transaction data management area 241 is received, and is information identifying the trading transaction.

A value in the item "merging process concatenation information" indicates the transaction number of a trading transaction to be concatenated with the trading transaction identified by the associated transaction number. In other words, the value in the item "merging process concatenation information" is information that associates the trading transaction identified by the transaction number with the executing trading transaction.

A value in the item "exclusive control waiting concatenation information" indicates the transaction number of a trading transaction waiting immediately after the trading transaction identified by the associated transaction number.

In FIG. 4, a transaction number "No. 1" is given to the transaction data of the buy order transaction and a transaction number "No. 2" is given to the transaction data of the sell order transaction.

Thus, the buy order transaction, that is, the first trading transaction is an executing trading transaction. Meanwhile, the sell order transaction is a waiting trading transaction and the transaction data thereof is stored in the waiting list 242.

Here, the order types of the two trading transactions are the buy order and the sell order. In addition, the number of trading transactions and the total data size are less than upper limit values. In this case, the merging determination unit 250 determines to merge these two trading transactions.

In response to this determination, the merging processing unit 260 merges the two trading transactions. Specifically, the merging processing unit 260 causes the executing trading transaction to execute a process in which the value in the merging process concatenation information associated with the transaction number No. 1 is set to the transaction number No. 2 of the waiting trading transaction to be merged.

Thus, in the present embodiment, through this process, the buy order transaction with the transaction number No. 1 and the sell order transaction with the transaction number No. 2 are concatenated into one virtual trading transaction.

In the example of FIG. 4, the waiting trading transaction to be concatenated with the executing trading transaction with the transaction number No. 1 is only the sell order transaction with the transaction number No. 2. For this reason, the value in the merging process concatenation information of the sell order transaction with the transaction number No. 2 is "none".

Next, with reference to FIG. 5, description will be provided for the definition file to which the merging determination unit 250 refers. FIG. 5 is a diagram illustrating an example of the definition file.

In a definition file 50, an upper limit value to be used by the executing trading transaction to determine whether or not to merge with trading transactions with the transaction data stored in the transaction data management area 241 is written in a description 51.

In the present embodiment, upper limit values to be referred to in various determinations as described above may be written as a definition file in the HDD 23.

Figure 6:
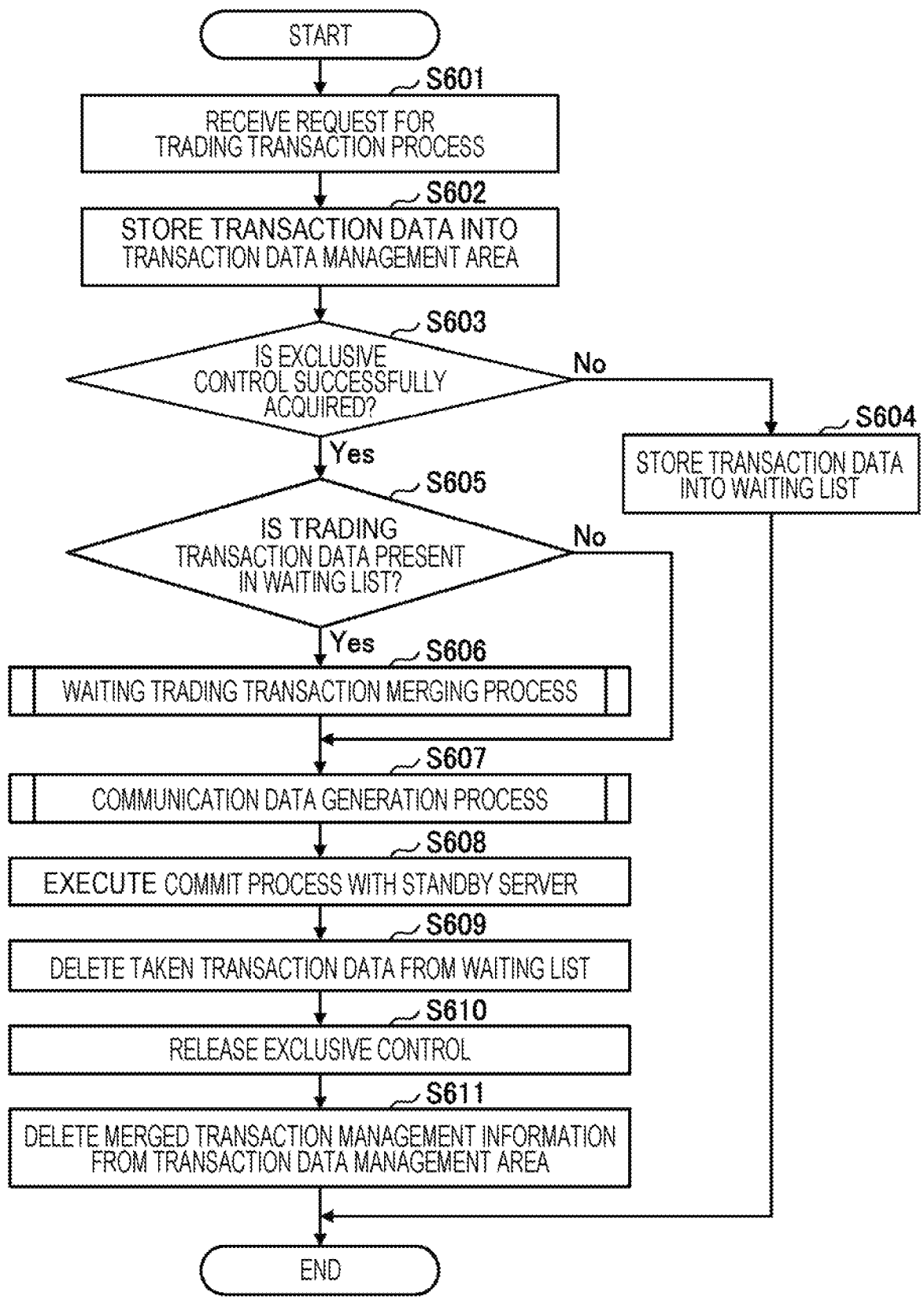
FIG. 6 is a first flowchart for describing an operation of the securities trading apparatus in the first embodiment.

Next, with reference to FIGS. 3 and 6 to 8, description will be provided for operations of the securities trading apparatus 200 in the present embodiment. FIG. 6 is a first flowchart for describing an operation of the securities trading apparatus in the first embodiment.

In the securities trading apparatus 200 in the present embodiment, the communication control unit 220 of the securities trading processing section 210 receives a request for a transaction process for a trading transaction (step S601). In other words, the communication control unit 220 receives the transaction data of the trading transaction.

The communication control unit 220 stores the received transaction data into the transaction data management area 241 in the order of reception while assigning a sequential number indicating the reception number thereto (step S602). In the above step, the values in the items "transaction number", "order type", and "data" are stored in the transaction data management area 241. Here, the processing at step S602 may be executed by the executing trading transaction and the waiting trading transaction concurrently.

The exclusive control unit 230 causes the trading transaction for which the transaction process is requested to determine whether or not the trading transaction acquires exclusive control (step S603). In other words, the exclusive control unit 230 determines whether or not the trading transaction for which the transaction process is requested is set as an executing trading transaction.

If the exclusive control is not acquired at step S603, that is, if the trading transaction for which the transaction process is requested is set as a waiting trading transaction, the exclusive control unit 230 causes the waiting trading transaction to store the transaction data of the waiting trading transaction into the waiting list 242 (step S604), and terminates the requested transaction process.

If the exclusive control is acquired at step S603, that is, if the trading transaction for which the transaction process is requested is set as the executing trading transaction, the securities trading processing section 210 causes the executing trading transaction to invoke the merging determination unit 250, and to determine whether or not the transaction data of a waiting trading transaction is stored in the waiting list 242 (step S605).

If the relevant transaction data is not present at step S605, the securities trading processing section 210 advances to step S607 to be described later.

If the relevant transaction data is present at step S605, the securities trading processing section 210 causes the executing trading transaction to invoke the merging processing unit 260 and to execute a waiting trading transaction merging process (step S606). The process at step S606 will be described in detail later.

The securities trading processing section 210 causes the executing trading transaction to execute a communication data generation process by means of the communication data generation unit 270 (step S607). The process at step S607 will be described in detail later.

The securities trading processing section 210 causes the commit processing unit 280 to execute a commit process of synchronizing the communication data generated at step S607 with the standby servers (step S608).

The securities trading processing section 210 causes the data management unit 290 to delete the transaction data of the waiting trading transaction taken at step S606 from the waiting list 242 (step S609).

The securities trading processing section 210 releases the exclusive control by the exclusive control unit 230 (step S610).

The securities trading processing section 210 causes the data management unit 290 to delete the transaction management information of the trading transactions merged at step S606 from the transaction data management area 241 (step S611), and terminates the transaction process for the executing trading transaction.

Figure 7:
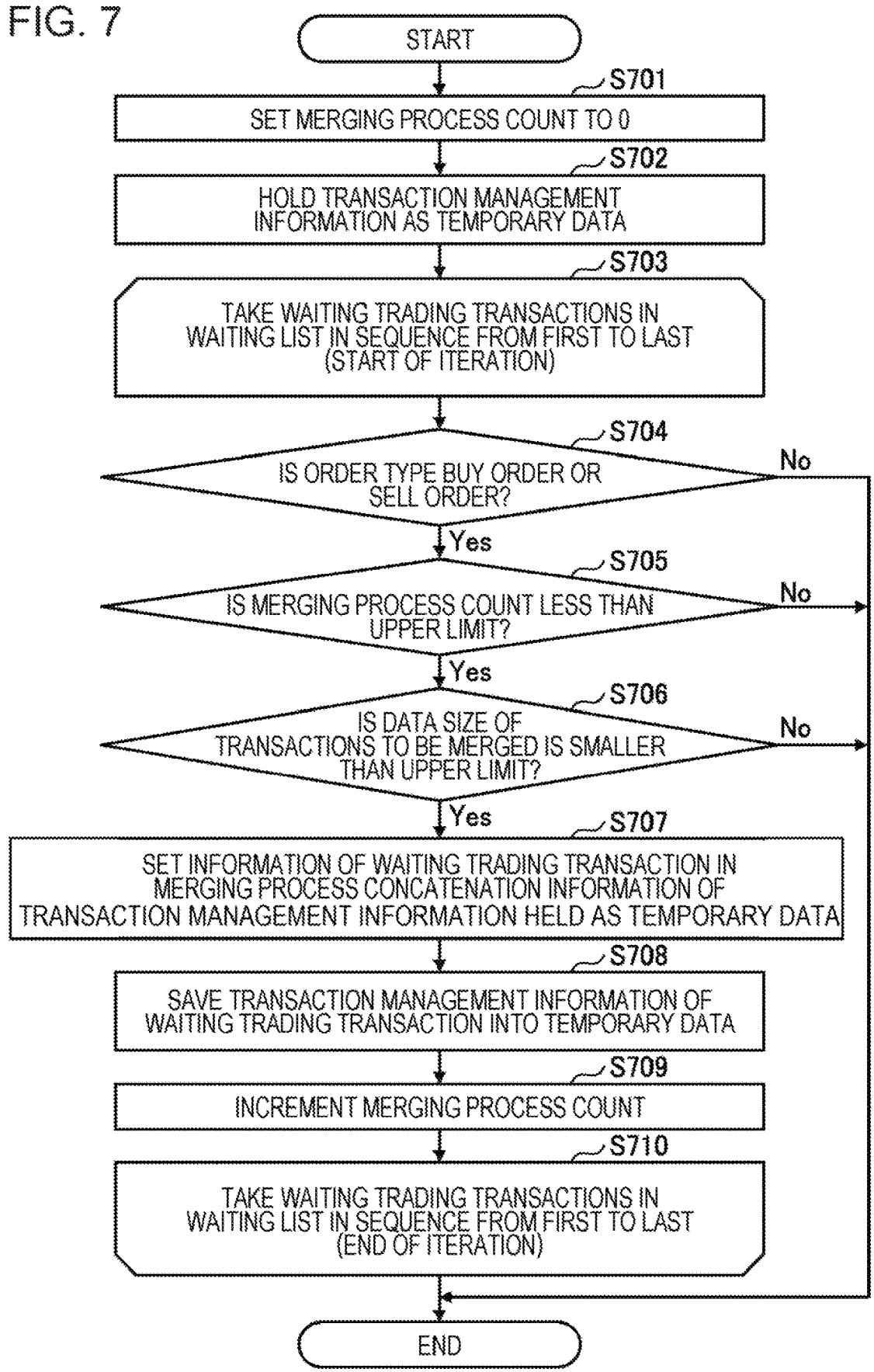
FIG. 7 is a second flowchart for describing an operation of the securities trading apparatus in the first embodiment.

Next, with reference to FIG. 7, description will be provided for the waiting trading transaction merging process by the executing trading transaction. FIG. 7 is a second flowchart for describing an operation of the securities trading apparatus in the first embodiment. FIG. 7 presents details of the process at step S606 in FIG. 6. The process presented in FIG. 7 is a process in which the securities trading apparatus 200 causes the executing trading transaction to execute the functions of the merging processing unit 260.

When the securities trading processing section 210 in the present embodiment causes the executing trading transaction to start the waiting trading transaction merging process, the executing trading transaction sets a merging process count to 0 (step S701). The executing trading transaction holds its own transaction management information as temporary data (step S702).

The executing trading transaction takes the transaction data of waiting trading transactions stored in the waiting list 242 in sequence from the first to the last transaction, and starts iterations of processing at and after step S704 (step S703).

By means of the merging determination unit 250, the executing trading transaction determines whether or not the order type of the taken transaction data of each waiting trading transaction is any of a buy order and a sell order (step S704). If the order type is not the buy order or the sell order at step S704, the executing trading transaction terminates the waiting trading transaction merging process.

If the order type is the buy order or the sell order at step S704, the executing trading transaction determines, by means of the merging determination unit 250, whether the total number of transactions including the waiting trading transaction(s) to be merged and the executing trading transaction is less than an upper limit value (step S705). In other words, the merging determination unit 250 determines whether the number of the taken waiting trading transactions is less than an upper limit value.

If the total number is equal to or more than the upper limit value at step S705, the executing trading transaction terminates the waiting trading transaction merging process.

If the total number is less than the upper limit value at step S705, the executing trading transaction determines, by means of the merging determination unit 250, whether the total data size of the transaction data of the waiting trading transaction(s) to be merged and the transaction data of the executing trading transaction is smaller than an upper limit value (step S706). If the total data size is equal to or larger than the upper limit value at step S706, the executing trading transaction terminates the waiting trading transaction merging process.

If the total data size is smaller than the upper limit value at step S706, the executing trading transaction sets information of the concerned waiting trading transaction in the merging process concatenation information of the transaction management information held as the temporary data by means of the merging processing unit 260 (step S707).

Specifically, the executing trading transaction sets the transaction number of this waiting trading transaction in the merging process concatenation information of its own transaction management information.

The executing trading transaction adds and saves the transaction management information of this waiting trading transaction into the temporary data (step S708), and increments the merging process count (step S709).

In sum, in the case where the number of waiting trading transactions extracted in accordance with the determination made by the merging determination unit 250 is less than a predetermined number and where the data size of the extracted waiting trading transactions is smaller than a predetermined value, the merging processing unit 260 in the present embodiment associates the extracted waiting trading transactions with the executing trading transaction to form one trading transaction.

The executing trading transaction iterates the processing at steps S704 to S709 until the transaction data of the last waiting trading transaction stored in the waiting list 242 (step S710), and then terminates the waiting trading transaction merging process.

In the present embodiment, among the trading transactions, only trading transactions of the buy and sell order types are targeted for merger as described above.

The reason for this will be described below.

Most of stock buy order transactions and sell order transactions each involve a process of inserting a single record into a stock order table. For this reason, in the case where a buy order transaction and a sell order transaction are united into a single virtual trading transaction and where a commit process is executed for the single virtual transaction, the transaction process may be executed at higher speed than in the case where the commit processes are executed for the buy order transaction and the sell order transaction respectively.

In contrast to this, for example, the change transaction to change the order quantity involves a process of moving the sequential number of this change transaction to the last one, and moving up the sequential numbers of the trading transactions after the change transaction, which is not a process of inserting a single record.

In another example, the cancellation transaction to cancel an order involves a process of moving up the sequential numbers of the trading transactions after the cancellation transaction, which is not a process of inserting a single record.

Since the change transaction and the cancellation transaction both involve updating records in multiple rows as described above, the time required for the transaction process is not shortened even if these transactions are merged.

The present embodiment is made by paying attention to the above points, and a buy order transaction and a sell order transaction, both of which only involve a process of inserting a single record into a stock order table, are merged into a virtual transaction. To put it another way, in the present embodiment, a simple buy order transaction and sell order transaction are merged.

In the present embodiment, moreover, the upper limit values are set for the total number and the total data size of trading transactions to be merged, which makes it possible to avoid a situation where a large number of trading transactions are merged and accordingly the time required for the transaction process becomes very long.

Figure 8:
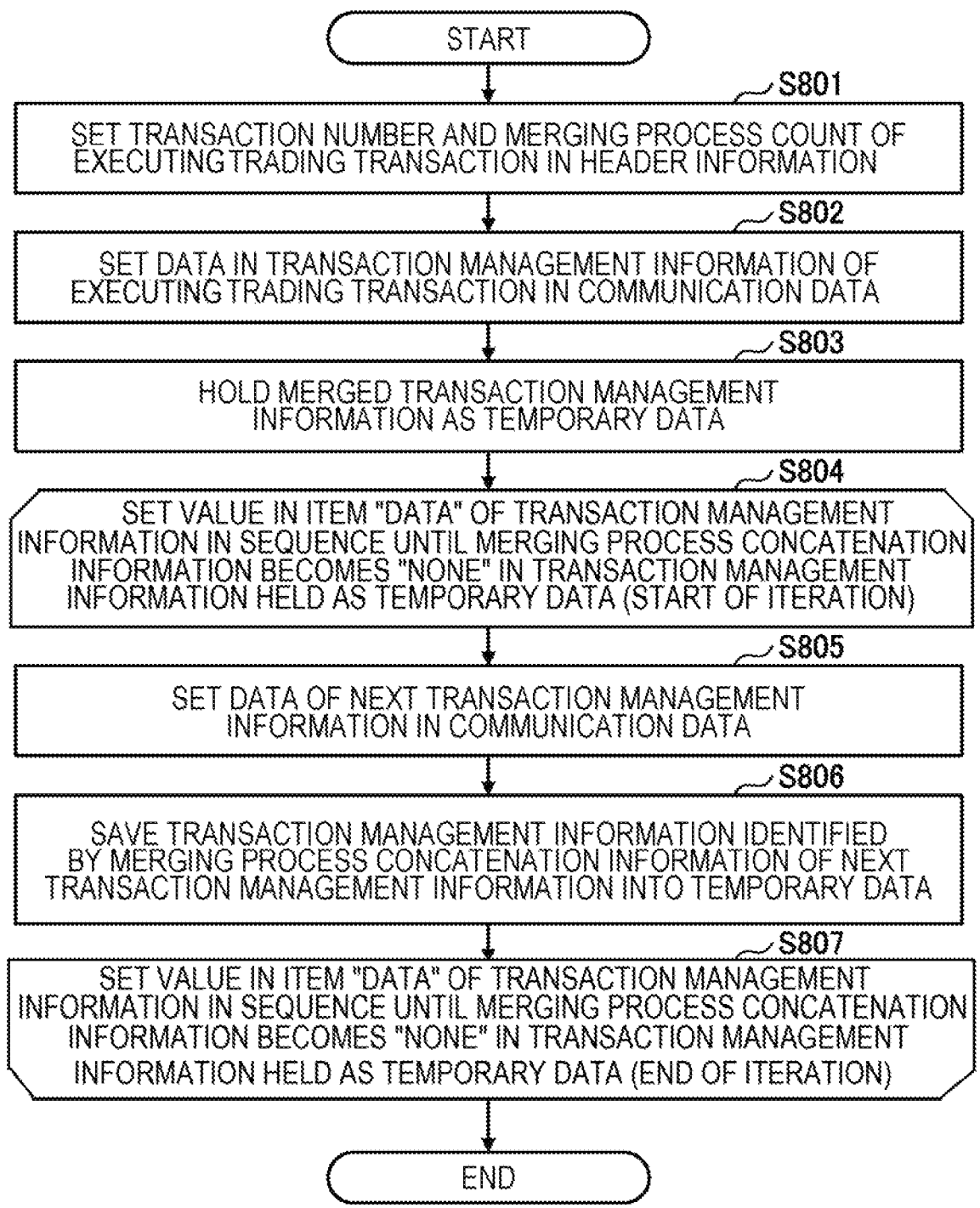
FIG. 8 is a third flowchart for describing an operation of the securities trading apparatus in the first embodiment.

Next, with reference to FIG. 8, description will be provided for the communication data generation process by the executing trading transaction. FIG. 8 is a third flowchart for describing an operation of the securities trading apparatus in the first embodiment. FIG. 8 presents details of the process at step S607 in FIG. 6. The process presented in FIG. 8 is a process in which the securities trading apparatus 200 causes the executing trading transaction to execute the functions of the communication data generation unit 270.

When starting generation of the communication data, the executing trading transaction refers to the transaction data management area 241 and sets its own transaction number and merging process count in the header information by means of the header setter 271 of the communication data generation unit 270 (step S801).

The executing trading transaction sets, in data information of the communication data, the value in the item "data" of the transaction management information of the executing trading transaction by means of the data setter 272 (step S802).

The executing trading transaction holds merged transaction management information as temporary data (step S803). The merged transaction management information includes the transaction management information of the executing trading transaction and the transaction management information of the waiting trading transaction associated with the executing trading transaction by the merging process concatenation information.

The executing trading transaction iterates the processing at and after S805 until the value in the merging process concatenation information becomes "none" in the merged transaction management information (step S804).

By means of the data setter 272, the executing trading transaction sets, in the data information of the communication data, the value in the item "data" of the transaction management information next to the transaction management information of the executing trading transaction (step S805).

The executing trading transaction saves, in the temporary data, the transaction management information identified by the transaction number specified in the merging process concatenation information of the transaction management information set in the data information of the communication data (step S806).

When the merging process concatenation information becomes "none" in the merged transaction management information through the aforementioned processing, the executing trading transaction terminates the iterations of the processing in steps S805 and S806, and terminates the communication data generation process.

Hereinafter, with reference to FIGS. 3 and 9 to 12, description will be provided for specific examples of the processes by the executing trading transaction in the present embodiment. FIG. 9 is a first diagram for describing the waiting trading transaction merging process.

FIG. 9 illustrates a state 1 where the transaction data of trading transactions received by the securities trading apparatus 200 are stored in a transaction data management area 241-1, and the trading transaction with the transaction number No. 1 is set as the executing trading transaction.

In this case, in the transaction data management area 241-1, the transaction data are stored as part of the transaction management information, and "none" is set in the merging process concatenation information.

In addition, in the state 1, the transaction data of the trading transactions with the transaction number No. 2 and following transaction numbers set as the waiting trading transactions are stored in a waiting list 242-1.

In the state 1, the trading transaction with the transaction number No. 1 is the executing trading transaction, and is not stored in the waiting list 242-1. Thus, in the state 1, the value in the exclusive control waiting concatenation information with the transaction number No. 1 is "none". The trading transaction with the transaction number No. 2 is the waiting trading transaction, and the transaction number of the waiting trading transaction immediately after the transaction number No. 2 is No. 3. For this reason, in the state 1, the value in the exclusive control waiting concatenation information with the transaction number No. 2 is "No. 3".

The trading transaction with the transaction number No. 5 is the waiting trading transaction, and there is no trading transaction waiting immediately after the transaction number No. 5. Thus, in the state 1, the value in the exclusive control waiting concatenation information with the transaction number No. 5 is "none".

In the waiting list 242-1, stored is information indicating that the transaction number of the first waiting trading transaction in the waiting list 242-1 is No. 2.

FIG. 9 illustrates a state 2 after the executing trading transaction executes the waiting trading transaction merging process.

In the state 2, the values in the merging process concatenation information of the transaction management information are set in a transaction data management area 241-2, and the transaction data of the waiting trading transactions are deleted from a waiting list 242-2.

In the transaction data management area 241-1, all the waiting trading transactions held in the waiting list 242-1 are merged with the executing trading transaction since the order types of all the waiting trading transactions are the buy order and the sell order.

The transaction data first stored in the waiting list 242-1 is of the trading transaction with the transaction number No. 2. Thus, the executing trading transaction sets "No. 2" as the value in the item "merging process concatenation information" of its own transaction management information.

The transaction data stored next to the transaction number No. 2 in the waiting list 242-1 is the transaction data of the waiting trading transaction with the transaction number No. 3. Thus, the executing trading transaction sets "No. 3" as the value in the item "merging process concatenation information" of the transaction management information with the transaction number No. 2.

In addition, the transaction number of the waiting trading transaction having the transaction data lastly stored in the waiting list 242-1 is No. 5. Thus, the value in the item "merging process concatenation information" of the transaction management information with the transaction number No. 5 is "none".

In this way, in the transaction data management area 241-2, the executing trading transaction is associated with all the waiting trading transactions stored in the waiting list 242-1.

All the transaction data stored in the waiting list 242-1 are associated with the executing trading transaction, and are therefore deleted from the waiting list 242-2.

In the present embodiment, the executing trading transaction and the waiting trading transactions are merged as described above, so that the data with the transaction numbers No. 1 to No. 5 form data 90 of one transaction. In the present embodiment, the commit process is completed by transmitting this data 90 to the standby server through one communication session, and accordingly the number of communication sessions may be reduced.

FIG. 10 is a second diagram for describing the waiting trading transaction merging process. FIG. 10 illustrates an example in which received trading transactions include a change transaction other than order transactions.

In a transaction data management area 241-3 illustrated in a state 1 of FIG. 10, the transaction data with the transaction numbers No. 1 to No. 5 are stored as part of the transaction management information. In the example of FIG. 10, it is seen that the trading transaction with the transaction number No. 3 is a change transaction according to the order type.

In this case, the trading transaction with the transaction number No. 3 is not merged with the other trading transactions.

In a transaction data management area 241-4 illustrated in a state 2 of FIG. 10, it is seen that the order transactions with the transaction numbers No. 1 and No. 2 are associated with each other and the order transactions with the transaction numbers No. 4 and No. 5 are associated with each other.

Figure 11:
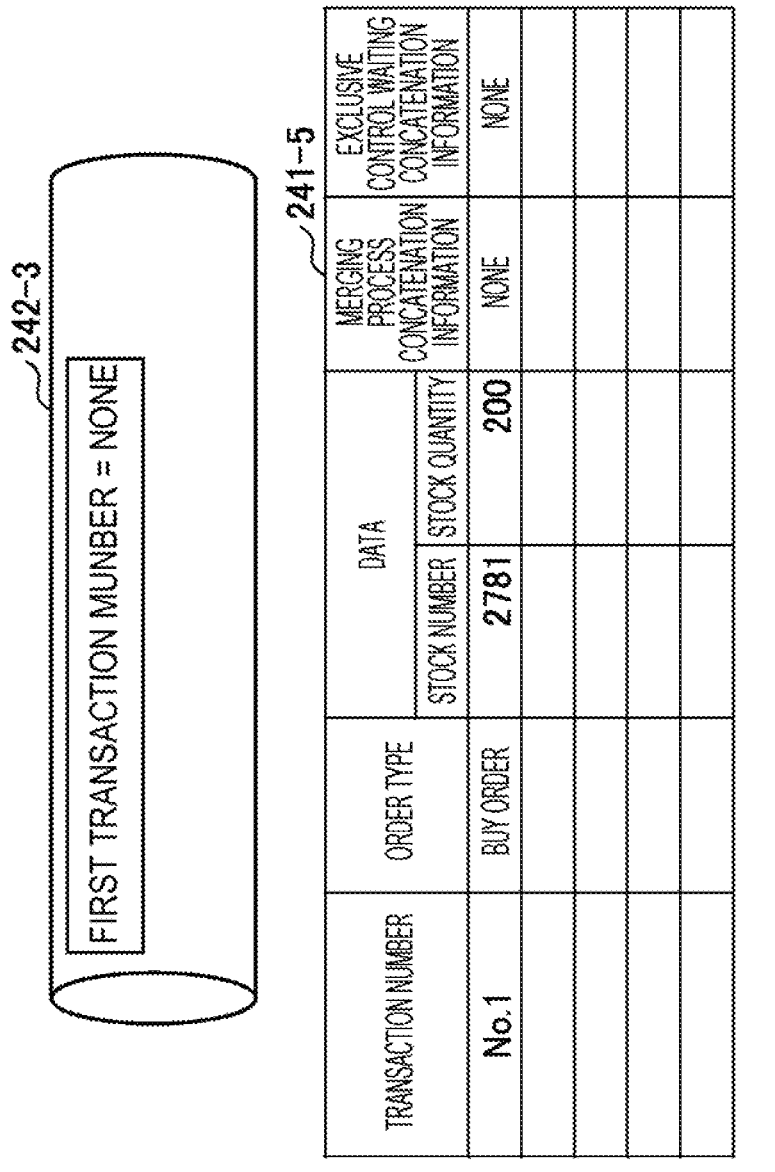
FIG. 11 is a third diagram for describing the waiting trading transaction merging process.

FIG. 11 is a third diagram for describing the waiting trading transaction merging process. FIG. 11 illustrates an example in which a received trading transaction is not accompanied by have a waiting trading transaction.

In the example of FIG. 11, only one trading transaction is received, and the transaction data of any waiting trading transaction is not present in a waiting list 242-3.

Thus, in the example of FIG. 11, the received trading transaction is set as the executing trading transaction, and a transaction data management area 241-5 is set such that only the transaction data with the transaction number No. 1 is stored and the value in the item "merging process concatenation information" is not set.

Figure 12:
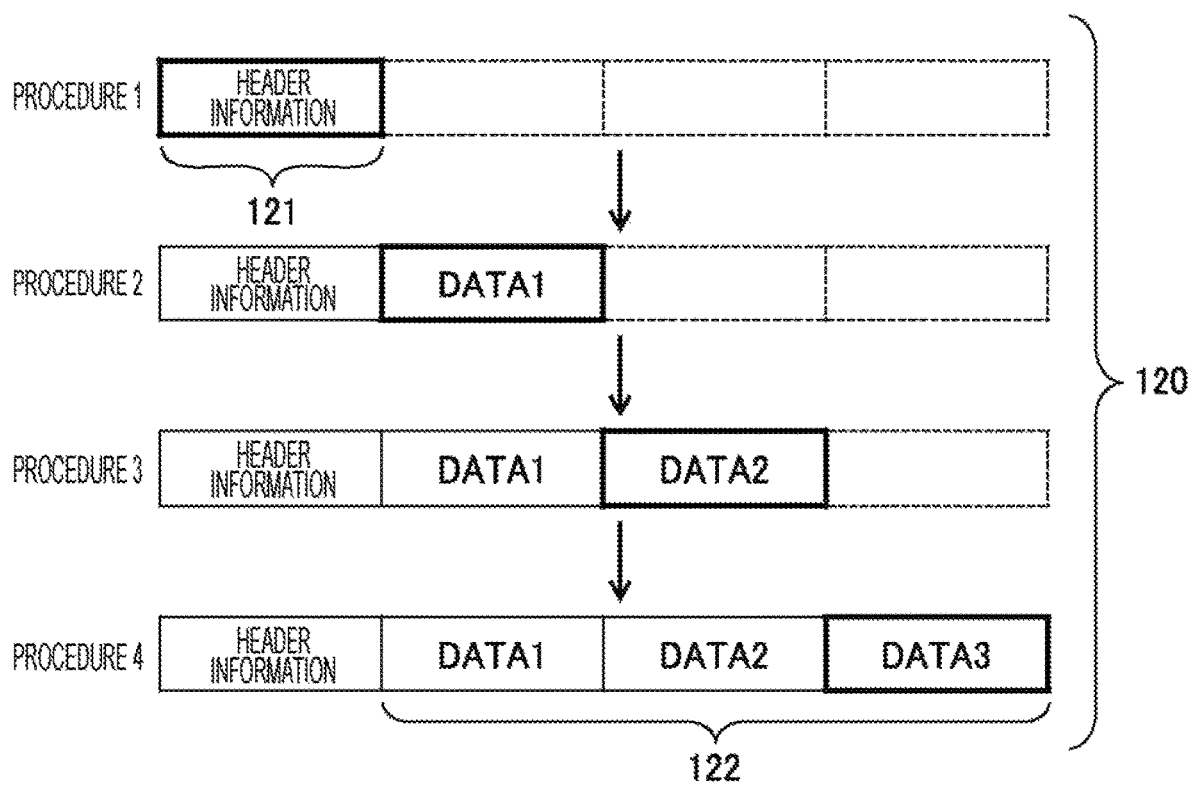
FIG. 12 is a diagram for describing a communication data generation process.

Next, with reference to FIG. 12, description will be provided for the communication data generation process by the executing trading transaction. FIG. 12 is a diagram for describing the communication data generation process.

In a transaction data management area 241-6 illustrated in FIG. 12, the waiting trading transactions with the transaction numbers No. 2 and No. 3 are associated with the executing trading transaction with the transaction number No. 1.

In this case, the executing trading transaction sets information including its own transaction number of "No. 1" and the merging process count of "3" in header information 121 of communication data 120 as illustrated in Procedure 1.

At a location following the header information 121 in the communication data 120, the executing trading transaction sets DATA1, which is the value in the item "data" of the transaction management information with the transaction number No. 1, as illustrated in Procedure 2.

At a location following DATA1 in the communication data 120, the executing trading transaction sets DATA2, which is the value in the item "data" with the transaction number No. 2 which is the value set in the item "merging process concatenation information" of the transaction management information with the transaction number No. 1, as illustrated in Procedure 3.

At a location following DATA2 in the communication data 120, the executing trading transaction sets DATA3, which is the value in the item "data" with the transaction number No. 3 which is the value set in the item "merging process concatenation information" of the transaction management information with the transaction number No. 2, as illustrated in Procedure 4.

The generation of the communication data as described above forms the data of the three trading transactions into one set of data information 122. Thus, according to the present embodiment, the commit process is completed through one communication session, and the load on the network may be reduced.

In the present embodiment, the order transactions are united and thereby the number of the order transactions is reduced as described above. This makes it possible to reduce the number of times that the commit process, which has to be done for every order transaction, is executed for the standby severs, and consequently speed up the securities trading processing. Specifically, the speed of the securities trading processing was increased up to about 40 times as measured actually.

Second Embodiment

Next, a second embodiment will be described with reference to the drawings. The second embodiment is different from the first embodiment in that a server that manages a database is applied. Thus, different features of the second embodiment from the first embodiment are described below, and sections and units having functions that are the same as or similar to those described in the first embodiment are indicated by the same reference symbols as those described in the first embodiment and will not be described in detail.

Figure 13:
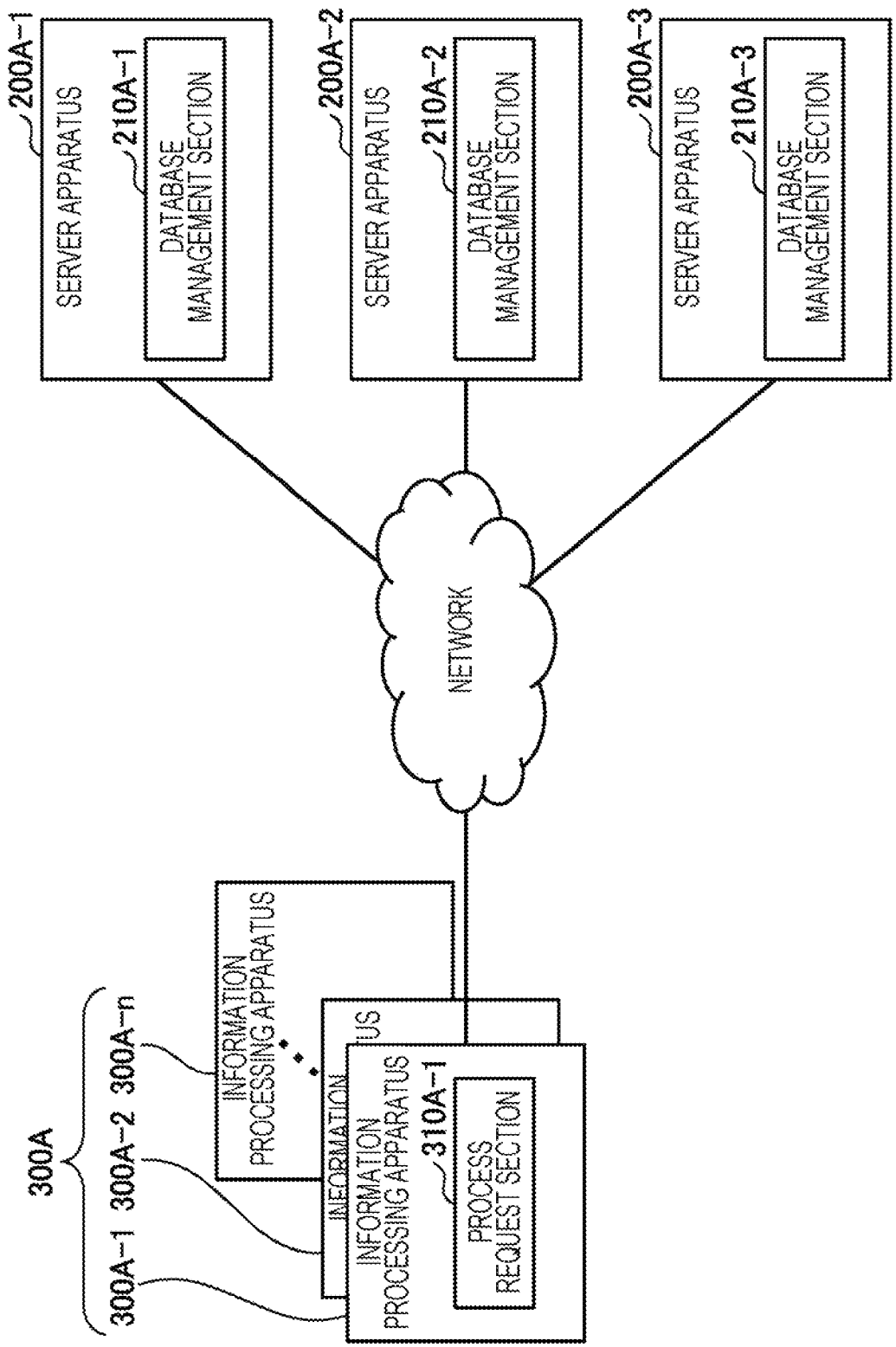
FIG. 13 is a diagram illustrating an example of a system configuration of a database system in a second embodiment.

FIG. 13 is a diagram illustrating an example of a system configuration of a database system in the second embodiment.

A database system 100A in the present embodiment includes server apparatuses 200A-1, 200A-2, and 200A-3 and information processing apparatuses 300A-1, 300A-2, ..., 300A-n, and the apparatuses are coupled to each other via a network.

The server apparatuses 200A-1, 200A-2, and 200A-3 are, for example, servers that execute transaction processes for transactions executed by the information processing apparatuses 300A-1, 300A-2, ..., 300A-n, and include an active server and standby servers.

The following description is provided, for example, on the assumption that the server apparatus 200A-1 is the active server and the server apparatuses 200A-2 and 200A-3 are the standby servers. The server apparatuses 200A-1, 200A-2, and 200A-3 include database management sections 210A-1, 210A-2, and 210A-3, respectively, and have the same functions.

In the following description, the server apparatuses 200A-1, 200A-2, and 200A-3 are referred to as the server apparatuses 200A when they are not distinguished from each other, and the database management sections 210A-1, 210A-2, and 210A-3 are referred to as the database management sections 210A when they are not distinguished from each other.

The information processing apparatuses 300A-1, 300A-2, ..., 300A-n include process request sections 310A-1, ..., 310A-n, respectively, and each transmit a transaction process for a transaction according to an operation on the information processing apparatus 300A-1, 300A-2, ..., 300A-n to the server apparatus 200A. In the following description, the information processing apparatuses 300A-1, 300A-2, ..., 300A-n are referred to as the information processing apparatuses 300A when they are not distinguished from each other, and the process request sections 310A-1, ..., 310A-n are referred to as the process request sections 310A when they are not distinguished from each other.

The server apparatuses 200A and the information processing apparatuses 300A in the present embodiment have the same hardware configurations as the hardware configuration of the securities trading apparatus 200, and therefore will not be described in detail.

Figure 14:
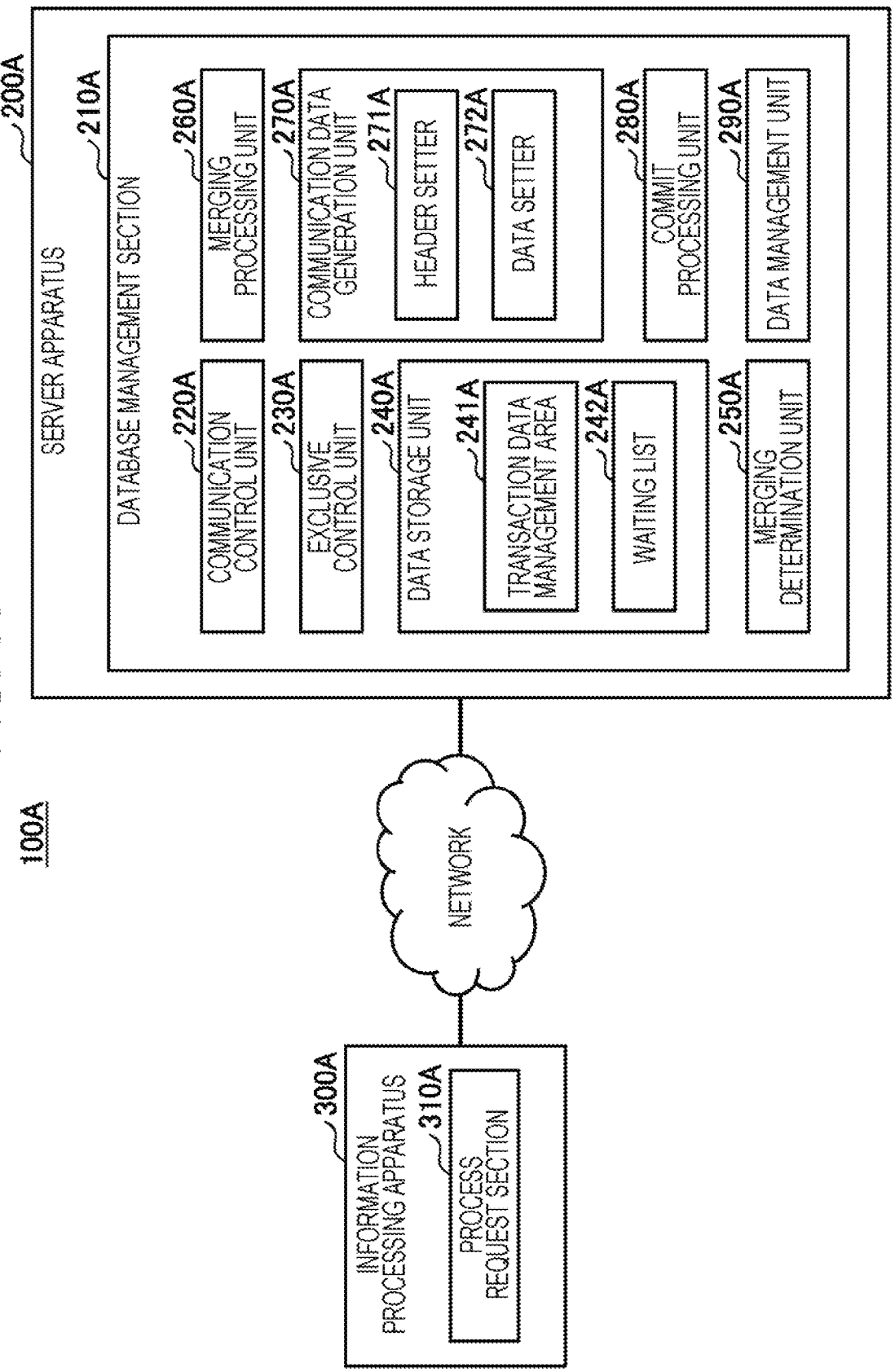
FIG. 14 is a diagram for describing functions of a server apparatus in the second embodiment.

FIG. 14 is a diagram for describing functions of the server apparatus in the second embodiment. The server apparatus 200A in the present embodiment includes the database management section 210A. The database management section 210A includes a communication control unit 220A, an exclusive control unit 230A, a data storage unit 240A, a merging determination unit 250A, a merging processing unit 260A, a communication data generation unit 270A, a commit processing unit 280A, and a data management unit 290A. Meanwhile, the information processing apparatus 300A includes the process request section 310A.

Transactions generated by the process request section 310A in the present embodiment are not limited to trading transactions for selling and buying of securities and so on, but also include transactions indicating various kinds of data manipulations on a database.

In the present embodiment, the functions of the database management section 210A and the process request section 310A are the same as the functions of the securities trading processing section 210 and the business processing section 310 except that the transactions to be handled include transactions other than trading transactions, and therefore will not be described in detail.

In the present embodiment, for example, the transactions include transactions concerning the data storage unit 240A in the server apparatus 200A, such as a transaction of a process of inserting a single record in a single row, and a transaction indicating update of data.

In the present embodiment, the transaction data includes a process type and data. The process type of the transaction of the process of inserting a single record in a single row is INSERT-COMMIT, and the process type of the transaction indicating update is UPDATE.

In the present embodiment, only transactions of the process type INSERT-COMMIT are merged into one virtual transaction. In the following description, a transaction of the process type INSERT-COMMIT is referred to as an insert transaction.

In addition, in the following description, a transaction that acquires exclusive control by means of the exclusive control unit 230A is referred to as an executing transaction, and other transactions are referred to as waiting transactions.

Figure 15:
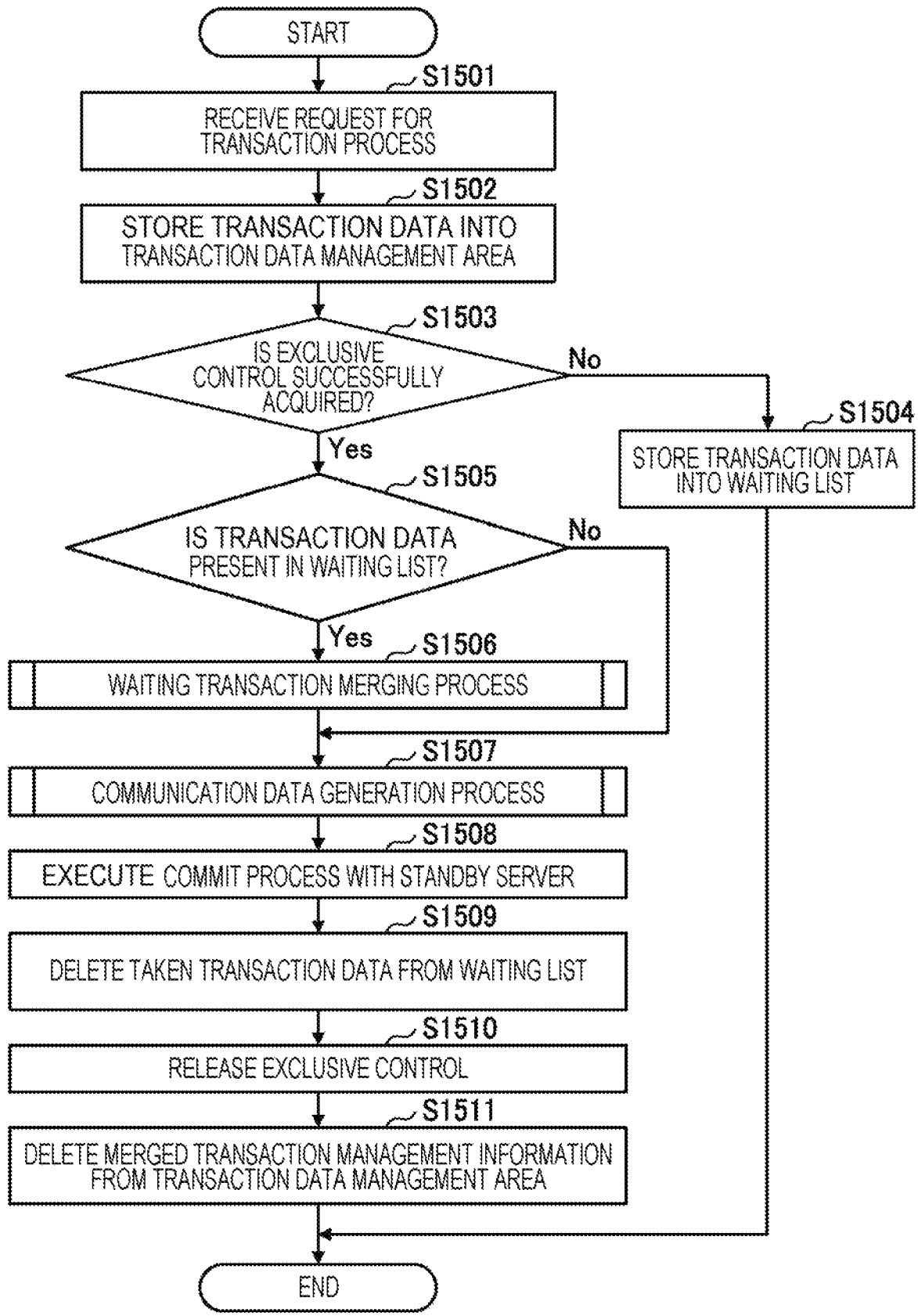
FIG. 15 is a first flowchart for describing an operation of the server apparatus in the second embodiment.

Hereinafter, description will be provided for operations of the server apparatus 200A in the second embodiment. FIG. 15 is a first flowchart for describing an operation of the server apparatus in the second embodiment.

The processing at steps S1501 to S1511 in FIG. 15 is the same as the processing at steps S601 to S611 in FIG. 6 except that transactions other than trading transactions are included, and therefore will not be described in detail.

Figure 16:
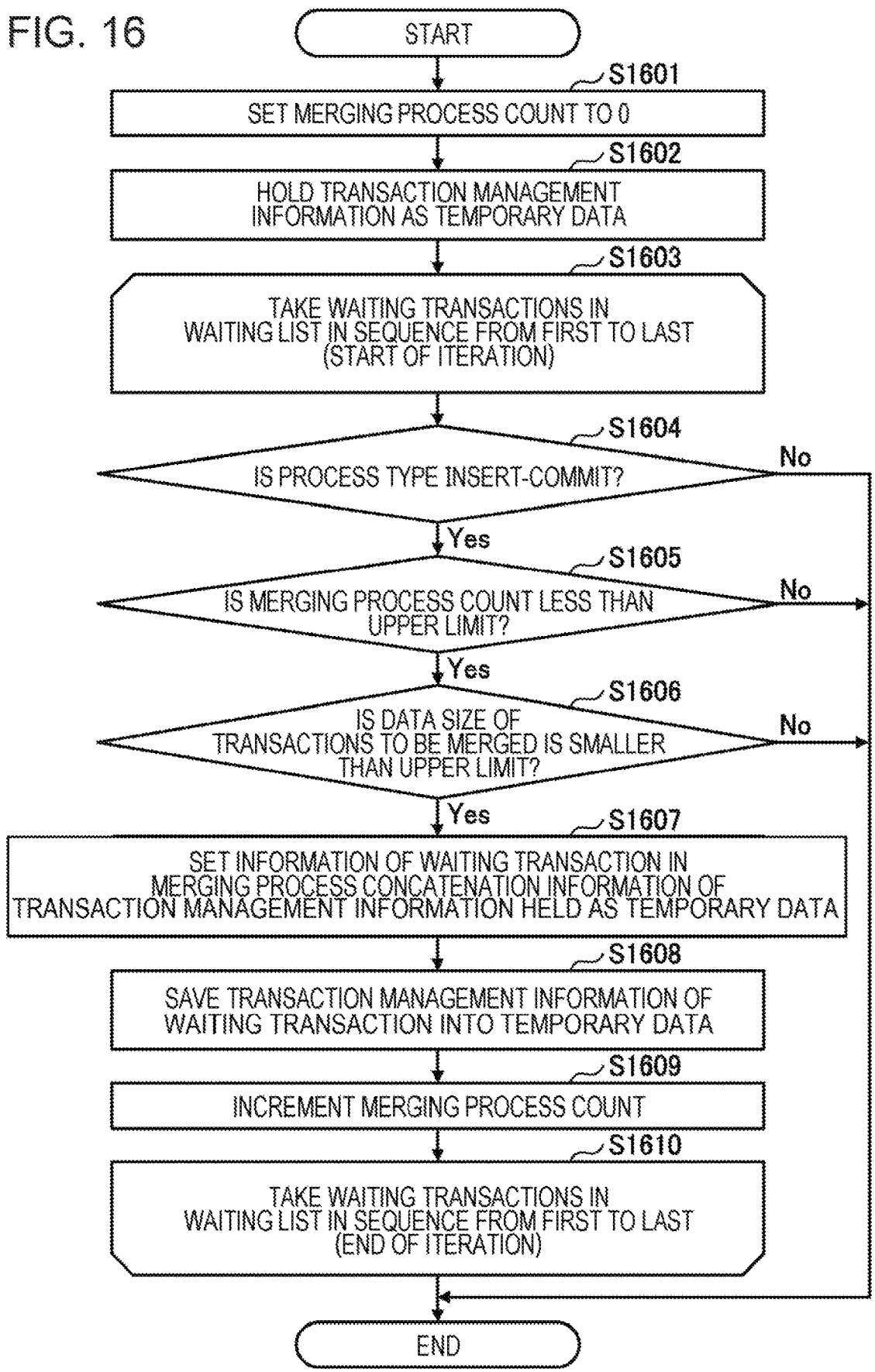
FIG. 16 is a second flowchart for describing an operation of the server apparatus in the second embodiment.

Next, with reference to FIG. 16, description will be provided for a waiting transaction merging process in the present embodiment. FIG. 16 is a second flowchart for describing an operation of the server apparatus in the second embodiment. FIG. 16 presents details of the process at step S1506 in FIG. 15.

The processing at steps S1601 to S1603 in FIG. 16 is the same as the processing at steps S701 to S703 in FIG. 7 and therefore will not be described in detail.

By means of the merging determination unit 250A, the executing transaction determines whether or not the process type of the taken transaction data of each waiting transaction is INSERT-COMMIT (step S1604). In other words, the merging determination unit 250A determines whether or not the waiting transaction is an insert transaction.

If the process type is not INSERT-COMMIT at step S1604, that is, if the waiting transaction is not an insert transaction, the executing transaction terminates the waiting transaction merging process.

If the process type is INSERT-COMMIT at step S1604, that is, if the waiting transaction is an insert transaction, the executing transaction executes processing at and after step S1605.

The processing at steps S1605 to S1610 is the same as the processing at steps S605 to S610 in FIG. 6, and therefore will not be described in detail.

Figure 17:
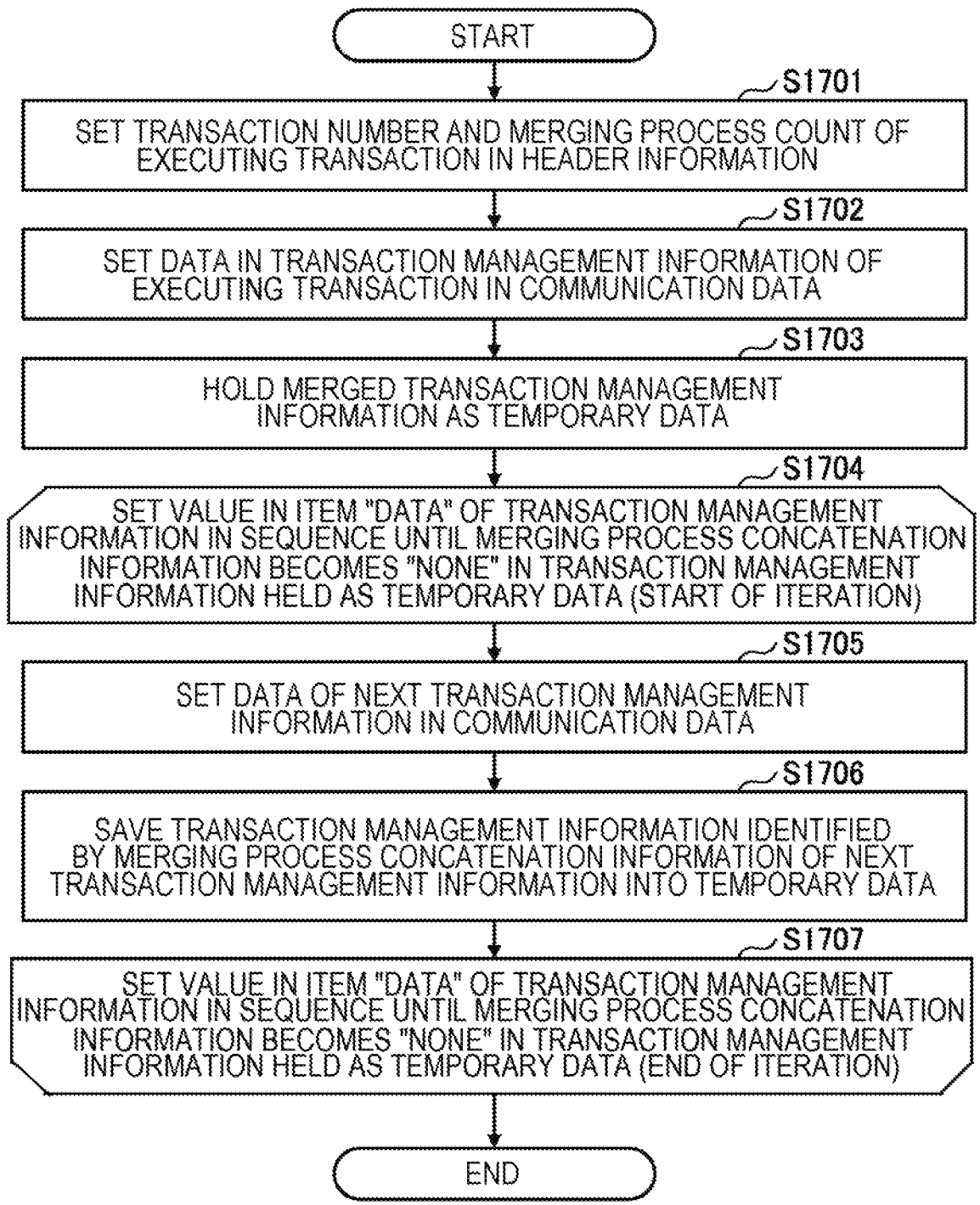
FIG. 17 is a third flowchart for describing an operation of the server apparatus in the second embodiment.

Next, a communication data generation process in the present embodiment will be described with reference to FIG. 17. FIG. 17 is a third flowchart for describing an operation of the server apparatus in the second embodiment. FIG. 17 presents details of the process at step S1507 in FIG. 15.

The processing at steps S1701 to S1711 in FIG. 17 is the same as the processing at steps S801 to S811 in FIG. 8 except that transactions other than trading transactions are included, and therefore will not be described in detail.

Next, with reference to FIGS. 18 to 21, description will be provided for specific examples of the processes by the executing transaction in the present embodiment. FIG. 18 is a first diagram for describing the waiting transaction merging process.

FIG. 18 illustrates a state 1 where the transaction data of transactions received by the server apparatus 200A are stored in a transaction data management area 241A-1, and the transaction with the transaction number No. 1 is set as the executing transaction.

In addition, in the state 1, the transaction data of the transactions with the transaction number No. 2 and following transaction numbers set as the waiting transactions are stored in a waiting list 242A-1.

FIG. 18 illustrates a state 2 after the executing transaction executes the waiting transaction merging process. The values in the merging process concatenation information of the transaction management information are set in a transaction data management area 241A-2, and the transaction data of the waiting transactions are deleted from a waiting list 242A-2.

In the transaction data management area 241A-1, all the waiting transactions are of the process type INSERT-COMMIT. Thus, the executing transaction sets "No. 2" as the value in the item "merging process concatenation information" of its own transaction management information.

The transaction data stored next to the transaction number No. 2 in the waiting list 242A-1 is the transaction data of the waiting transaction with the transaction number No. 3. Thus, the executing transaction sets "No. 3" as the value in the item "merging process concatenation information" of the transaction management information with the transaction number No. 2.

In this way, in the transaction data management area 241A-2, the executing transaction is associated with all the waiting transactions stored in the waiting list 242A-1.

All the transaction data stored in the waiting list 242A-1 are associated with the executing transaction, and are therefore deleted from the waiting list 242A-2.

In the present embodiment, the executing transaction and the waiting transactions are merged as described above, so that the data with the transaction numbers No. 1 to No. 5 form data 90A of one transaction. In the present embodiment, the commit process is completed by transmitting this data 90A to the standby servers through one communication session, and accordingly the number of communication sessions may be reduced.

FIG. 19 is a second diagram for describing the waiting transaction merging process. FIG. 19 illustrates an example in which received transactions include a transaction of a process type other than INSERT-COMMIT.

In a transaction data management area 241A-3 illustrated in a state 1 of FIG. 19, the transaction data with the transaction numbers No. 1 to No. 6 are stored as part of the transaction management information. In the example of FIG. 19, it is seen that the transaction with the transaction number No. 4 is an UPDATE transaction according to the process type.

In this case, the transaction with the transaction number No. 4 is not merged with the other waiting transactions of the process type INSERT-COMMIT.

In a transaction data management area 241A-4 illustrated in a state 2 of FIG. 19, it is seen that the transactions with the transaction numbers No. 1 to No. 3 are associated with each other and the transactions with the transaction numbers No. 5 and No. 6 are associated with each other.

Figure 20:
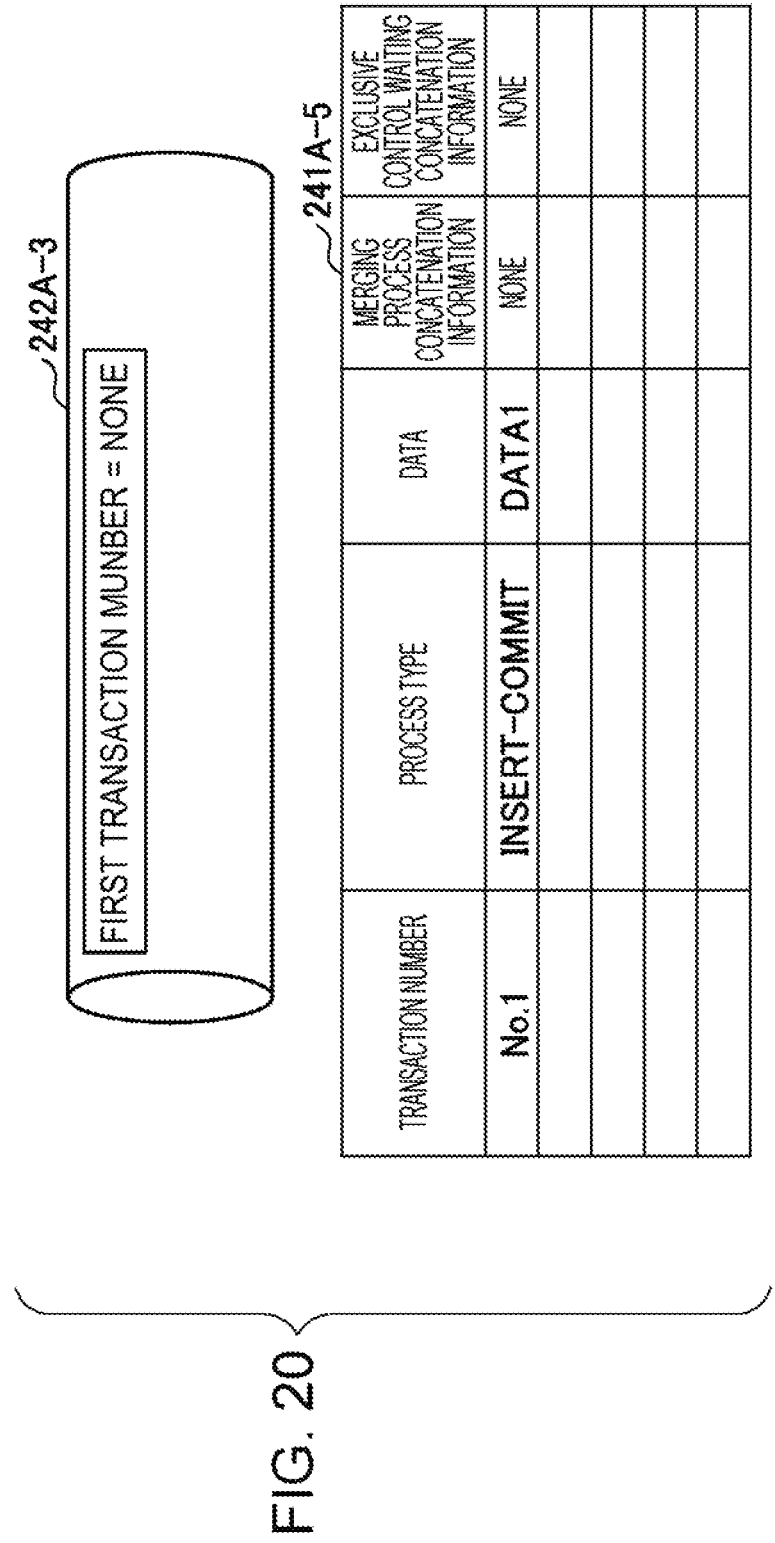
FIG. 20 is a third diagram for describing the waiting transaction merging process.

FIG. 20 is a third diagram for describing the waiting transaction merging process. FIG. 20 illustrates an example in which a received transaction is not accompanied by a waiting transaction.

In the example of FIG. 20, only one transaction is received, and the transaction data of any waiting transaction is not present in a waiting list 242A-3.

Thus, in the example of FIG. 20, the received transaction is set as the executing transaction, and a transaction data management area 241A-5 is set such that only the transaction data with the transaction number No. 1 is stored and the value in the item "merging process concatenation information" is not set.

Figure 21:
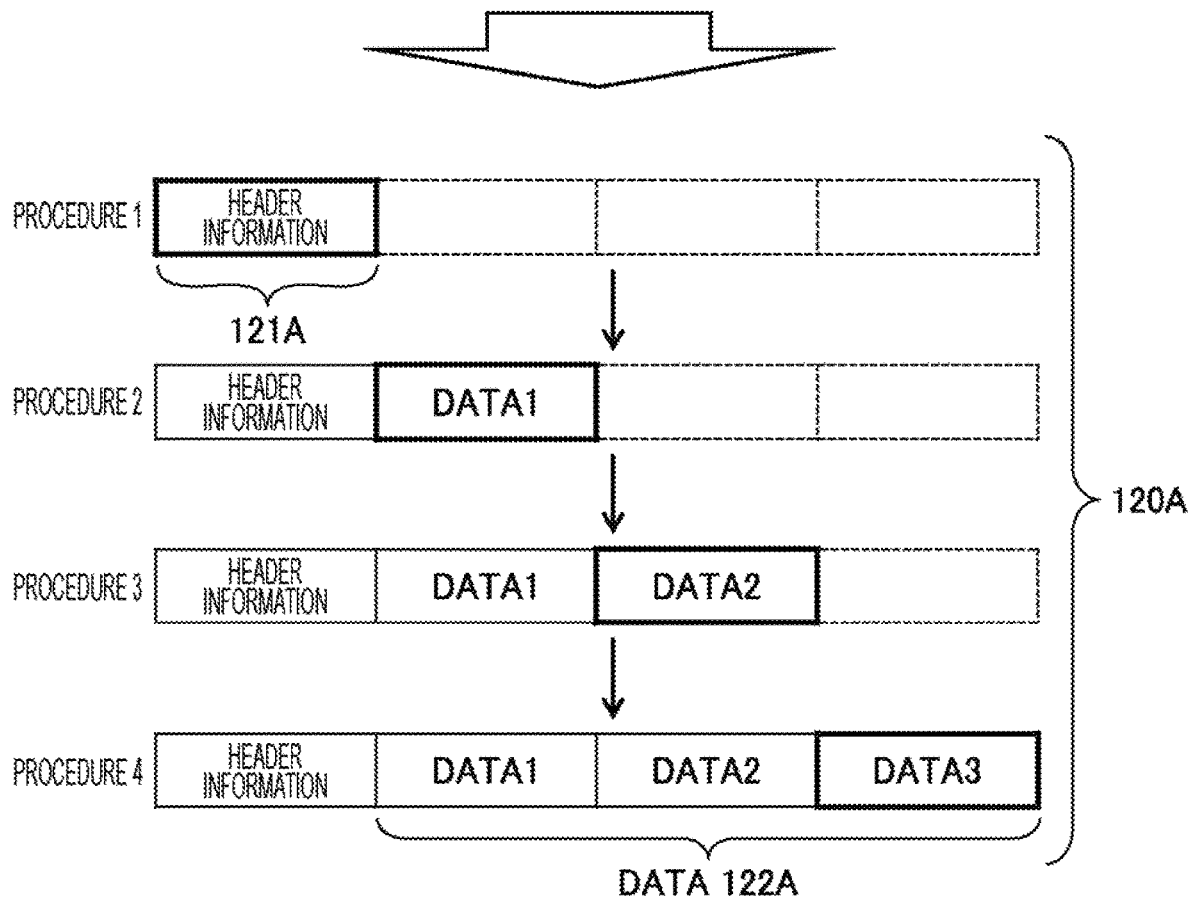
FIG. 21 is a diagram for describing a communication data generation process by an executing transaction.

Next, with reference to FIG. 21, description will be provided for the communication data generation process by the executing transaction. FIG. 21 is a diagram for describing the communication data generation process by the executing transaction.

In a transaction data management area 241A-6 illustrated in FIG. 21, the waiting transactions with the transaction numbers No. 2 and No. 3 are associated with the executing transaction with the transaction number No. 1.

In this case, the executing transaction sets information including its own transaction number of "No. 1" and the merging process count of "3" in header information 121A of communication data 120A.

The executing transaction sets the value in the item "data" with the transaction number No. 1 at a location following the header information 121A, sets the value in the item "data" with the transaction number No. 2 at the following location, and further sets the value in the item "data" with the transaction number No. 3 at the following location.

In the present embodiment, the generation of the communication data as described above forms the data of the three transactions into one set of data information 122A. Thus, according to the present embodiment, the commit process is completed through one communication session, and the load on the network may be reduced.

In the present embodiment, the transactions of the process type INSERT-COMMIT are united and thereby the number of the transactions is reduced as described above. This makes it possible to reduce the number of times that the commit process is executed, and consequently speed up the processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A securities trading apparatus, comprising:
 a memory; and
 a processor coupled to the memory, the processor configured to:
 extract transactions from trading transactions stored in the memory, the extracted transactions being one of order transactions or insert transactions, each of the order transactions being a buy order transaction or a sell order transaction;
 generate a single trading transaction from the extracted transactions;
 generate the single trading transaction by associating a first trading transaction with the extracted transactions, the first trading transaction being a trading transaction for which a transaction process is to be executed;
 generate communication data in which header information is associated with integrated transaction data, the header information including information that is included in first transaction data of the first trading transaction, the integrated transaction data including data that is included in the first transaction data and data that is included in each of the extracted transactions; and synchronize the communication data with another securities trading apparatus to reduce a load on a network, reduce a number of times a process is executed, and increase a speed of the processing.

2. The securities trading apparatus according to claim 1, wherein the processor is further configured to generate the single trading transaction when a total number of transactions including the first trading transaction and the extracted transactions is less than a predetermined upper limit value.

3. The securities trading apparatus according to claim 2, wherein the processor is further configured to generate the single trading transaction when a total data size of the transactions including the first trading transaction and the extracted transactions is smaller than a predetermined upper limit value.

4. A securities trading method, comprising:

extracting, by a computer, transactions from trading transactions stored in a memory, the extracted transactions being one of order transactions or insert transactions, each of the order transactions being a buy order transaction or a sell order transaction;

generating a single trading transaction from the extracted transactions;

generating the single trading transaction by associating a first trading transaction with the extracted transactions, the first trading transaction being a trading transaction for which a transaction process is to be executed;

generating communication data in which header information is associated with integrated transaction data, the header information including information that is included in first transaction data of the first trading transaction, the integrated transaction data including data that is included in the first transaction data and data that is included in each of the extracted transactions; and synchronizing the communication data with another securities trading apparatus to reduce a load on a network, reduce a number of times a process is executed, and increase a speed of the processing.

5. A non-transitory computer-readable recording medium having stored therein a program that causes a computer to execute a process, the process comprising:

extracting transactions from trading transactions stored in a memory, the extracted transactions being one of order transactions or insert transactions, each of the order transactions being a buy order transaction or a sell order transaction;

generating a single trading transaction from the extracted transactions;

generating the single trading transaction by associating a first trading transaction with the extracted transactions, the first trading transaction being a trading transaction for which a transaction process is to be executed;

generating communication data in which header information is associated with integrated transaction data, the header information including information that is included in first transaction data of the first trading transaction, the integrated transaction data including data that is included in the first transaction data and data that is included in each of the extracted transactions; and synchronizing the communication data with another securities trading apparatus to reduce a load on a network, reduce a number of times a process is executed, and increase a speed of the processing.

* * * * *